(12) United States Patent
Hoffman et al.

(10) Patent No.: US 8,082,008 B2
(45) Date of Patent: Dec. 20, 2011

(54) USER-INTERFACE AND ARCHITECTURE FOR PORTABLE PROCESSING DEVICE

(75) Inventors: George Hoffman, New Haven, CT (US); Erik Perotti, Santa Cruz, CA (US); Elizabeth Dykstra-Erickson, San Francisco, CA (US)

(73) Assignee: Access Co., Ltd., Tokyo (JP)

( * ) Notice: Subject to any disclaimer, the term of this patent is extended or adjusted under 35 U.S.C. 154(b) by 365 days.

(21) Appl. No.: 11/674,026

(22) Filed: Feb. 12, 2007

(65) Prior Publication Data
US 2008/0125180 A1 May 29, 2008

Related U.S. Application Data

(60) Provisional application No. 60/772,160, filed on Feb. 10, 2006.

(51) Int. Cl.
*H04B 1/38* (2006.01)

(52) U.S. Cl. ........ 455/566; 715/700; 715/810; 715/817; 715/821; 715/828; 455/418; 455/550.1; 455/556.2

(58) Field of Classification Search ............. 455/73, 455/550.1, 566; 715/762–862, 705, 708, 715/710, 711
See application file for complete search history.

(56) References Cited

U.S. PATENT DOCUMENTS

| 6,686,931 B1 * | 2/2004 | Bodnar ............... 715/741 |
| 7,231,229 B1 * | 6/2007 | Hawkins et al. ....... 455/564 |
| 2001/0015721 A1 | 8/2001 | Byun et al. ............ 345/169 |
| 2002/0115476 A1 * | 8/2002 | Padawer et al. ........ 455/564 |
| 2002/0123368 A1 * | 9/2002 | Yamadera et al. ...... 455/556 |
| 2002/0151283 A1 * | 10/2002 | Pallakoff ............... 455/90 |
| 2003/0013483 A1 * | 1/2003 | Ausems et al. ......... 455/556 |
| 2004/0085360 A1 | 5/2004 | Pratt et al. ............ 345/773 |
| 2004/0261031 A1 | 12/2004 | Tuomainen et al. ..... 715/739 |
| 2006/0129932 A1 * | 6/2006 | Weber et al. .......... 715/705 |
| 2007/0045961 A1 * | 3/2007 | Morris ................. 273/292 |

FOREIGN PATENT DOCUMENTS

| EP | 1453315 A2 | 9/2004 |
| FR | 2830093 | 3/2003 |
| GB | 2329813 A | 3/1999 |
| WO | WO 02/10893 A2 | 2/2002 |

OTHER PUBLICATIONS

International Search Report and Written Opinion, PCT/US2007/062004, ACCESS Systems Americas, Inc., dated Jun. 26, 2007.

* cited by examiner

*Primary Examiner* — Kamran Afshar
*Assistant Examiner* — Neda Behrooz
(74) *Attorney, Agent, or Firm* — Berry & Associates P.C.

(57) ABSTRACT

A user interface for a portable device is disclosed. The method includes a computer-implemented method for providing a user interface for interacting with a computing device, the method including the steps of: representing an indicator of an application on the computing device in a highlighted state when a user navigates to the indicator; presenting an option panel contextually related to the application when the user selects a panel key on the computing device; and running the application when the user selects an execute key on the computing device.

19 Claims, 29 Drawing Sheets

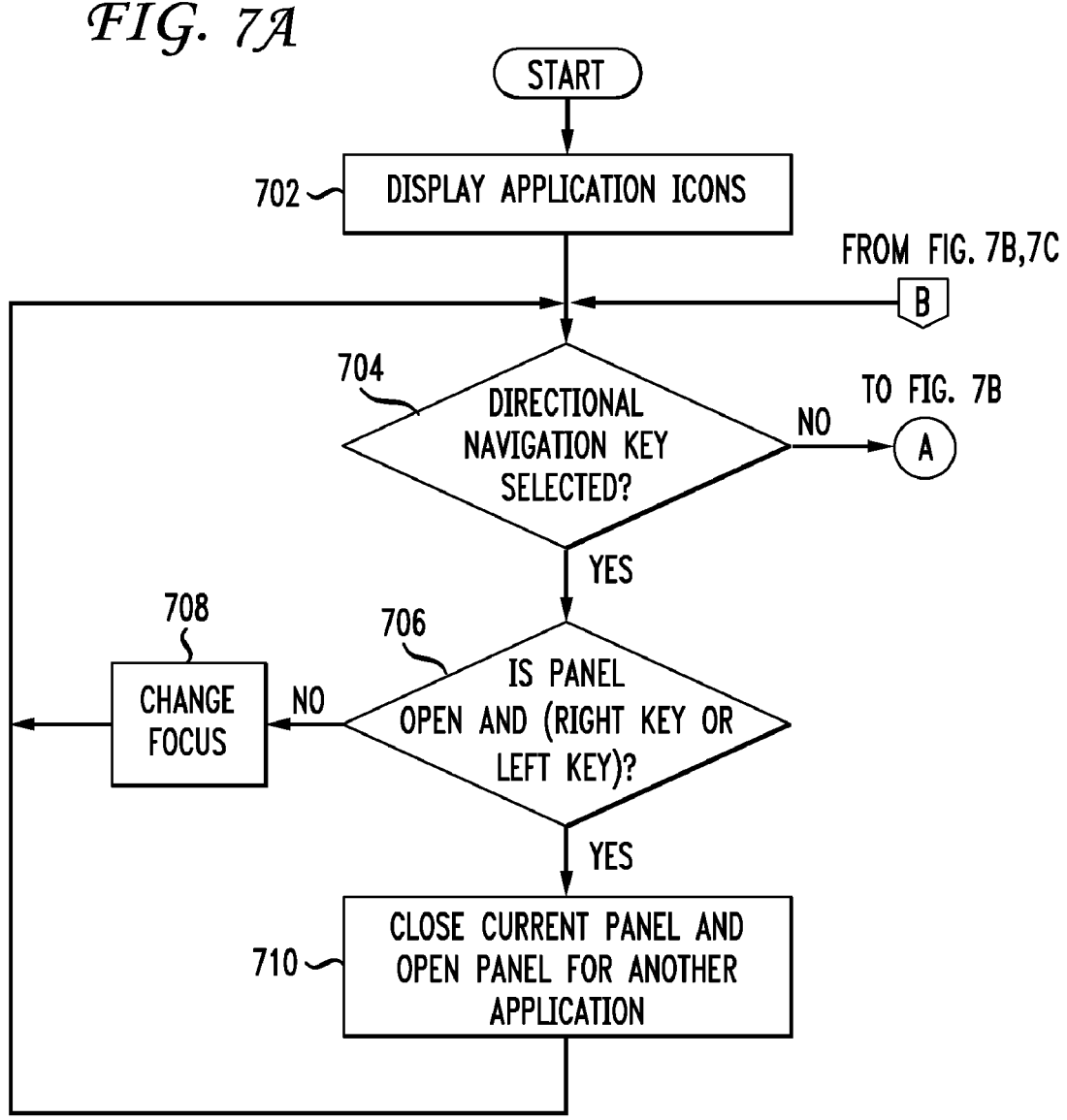

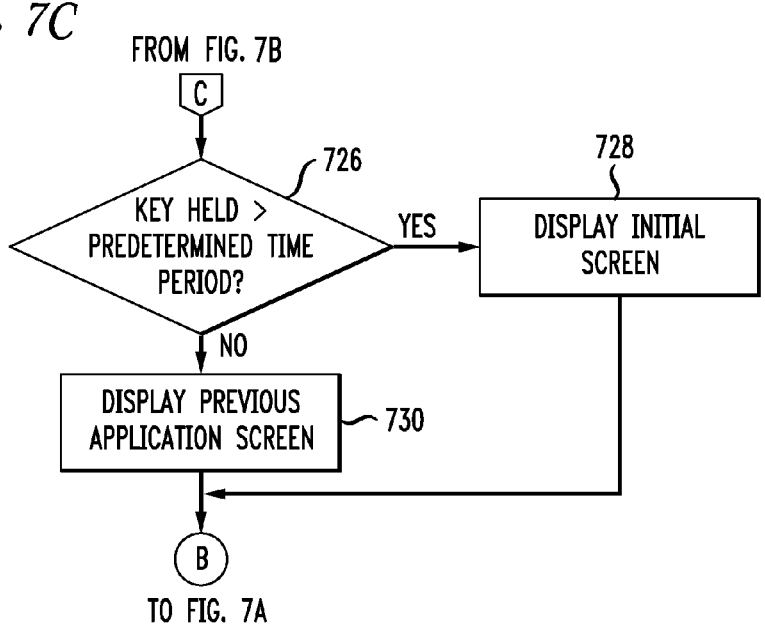
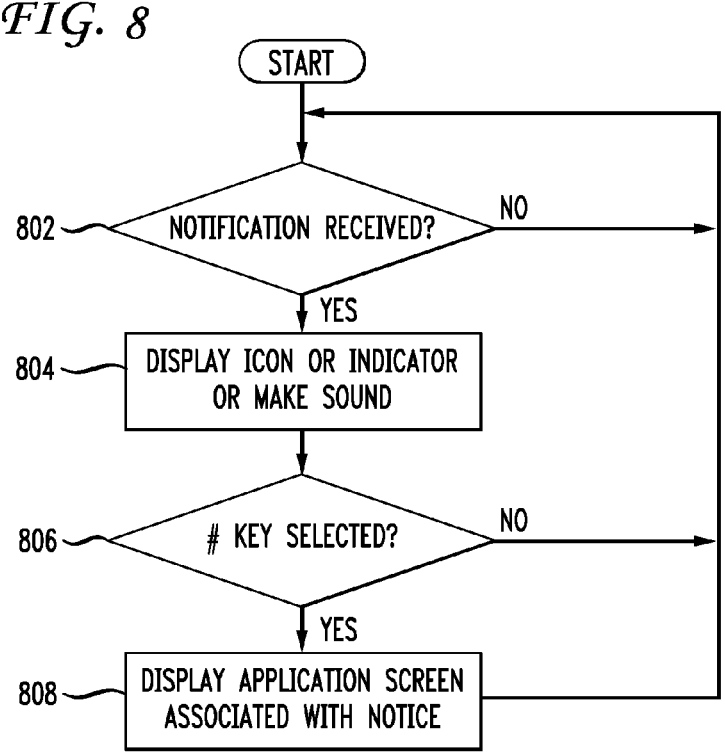

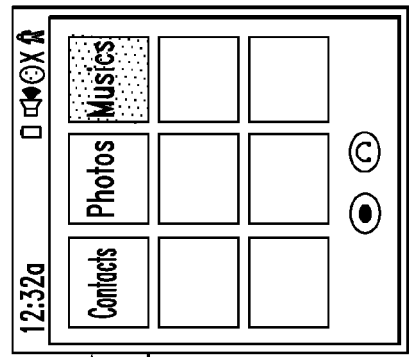
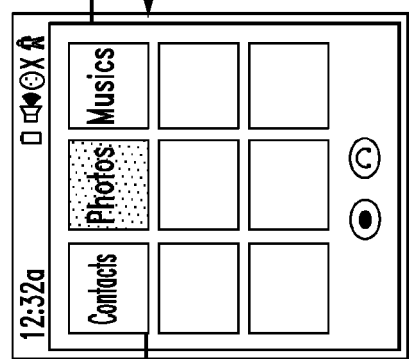
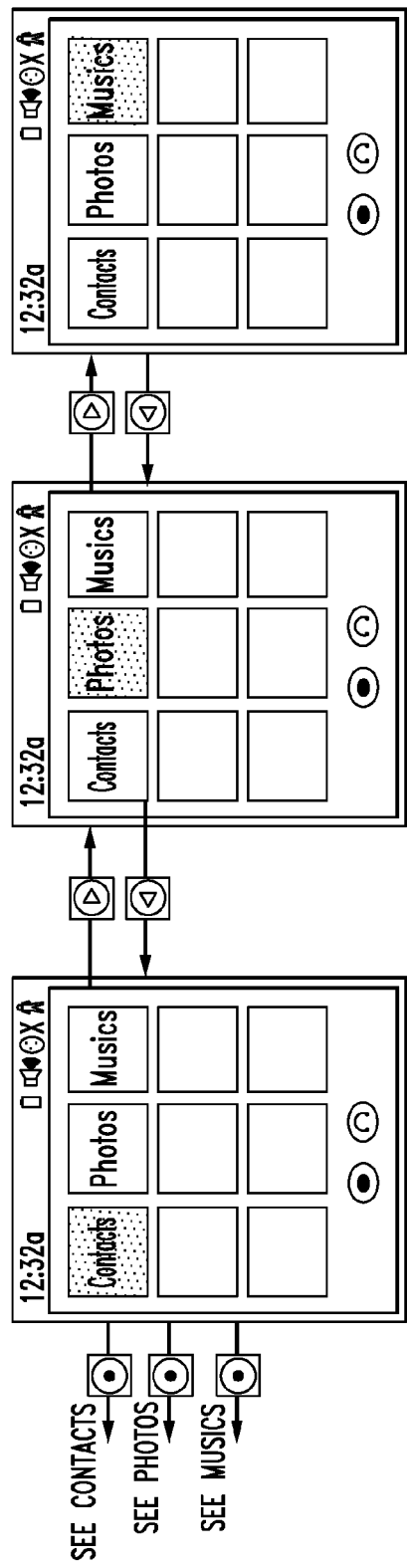
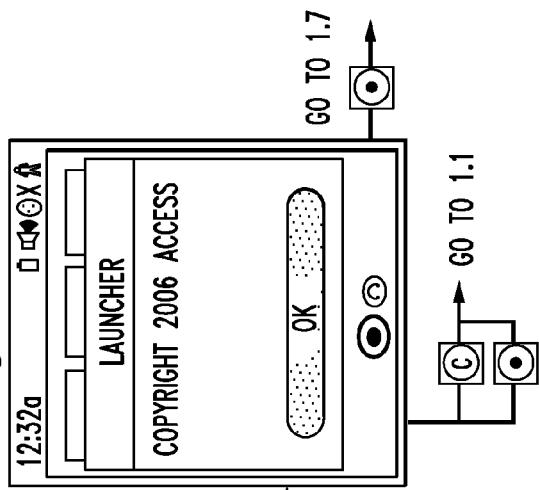
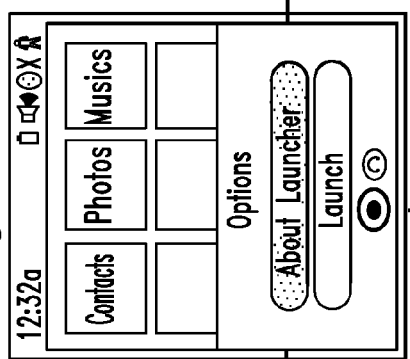
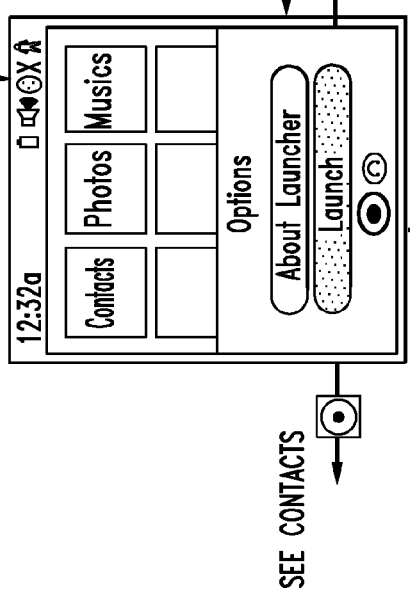

FIG. 30A
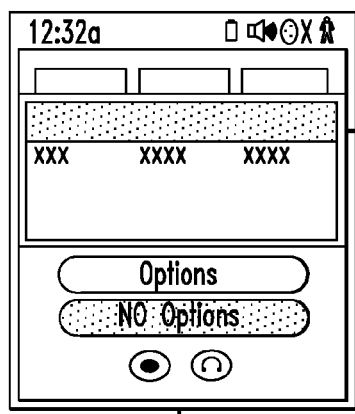
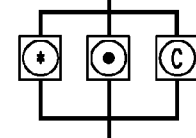
→ GO TO 1.6
FIG. 30B
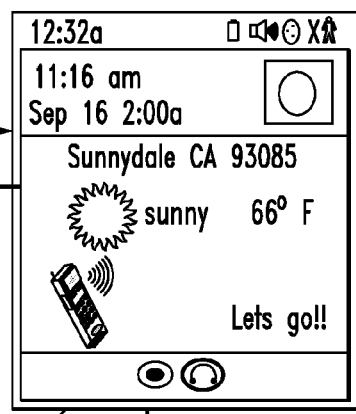
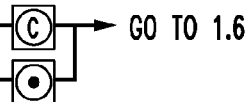
→ GO TO 1.6
FIG. 30C
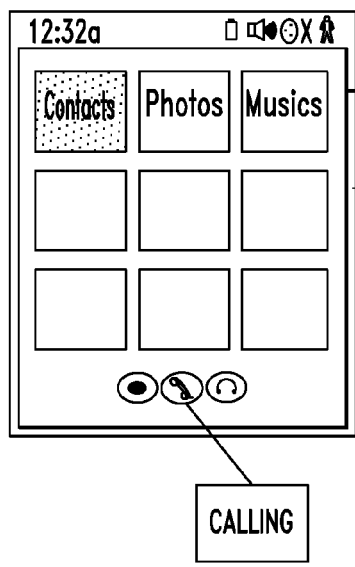
FIG. 30D

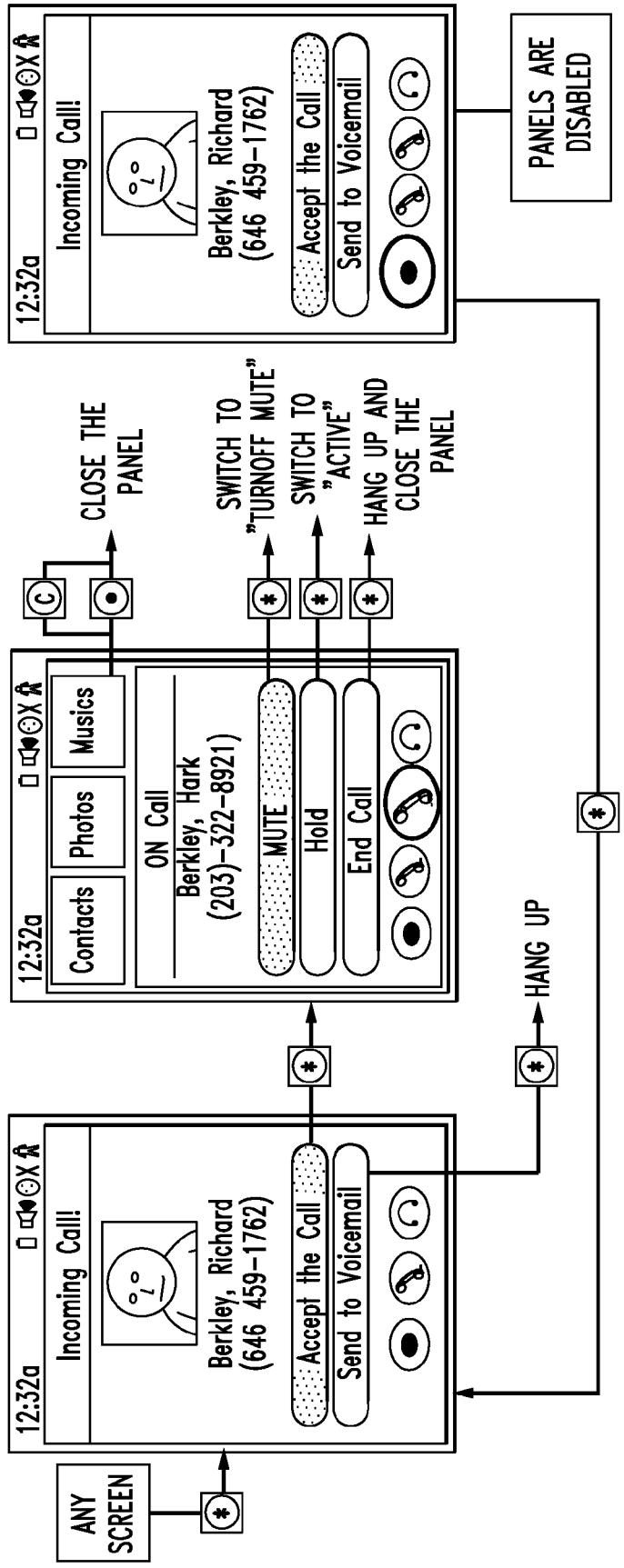

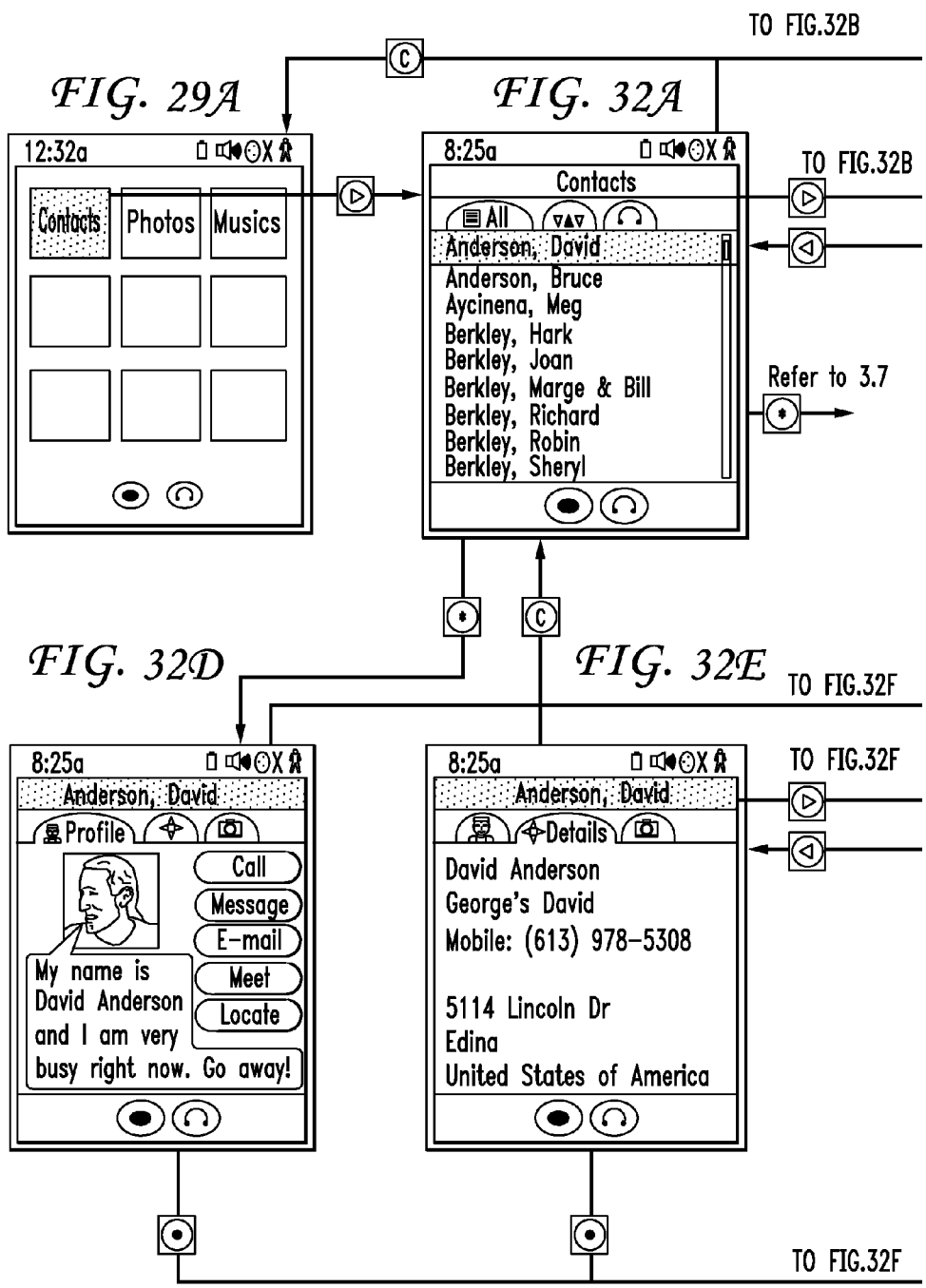

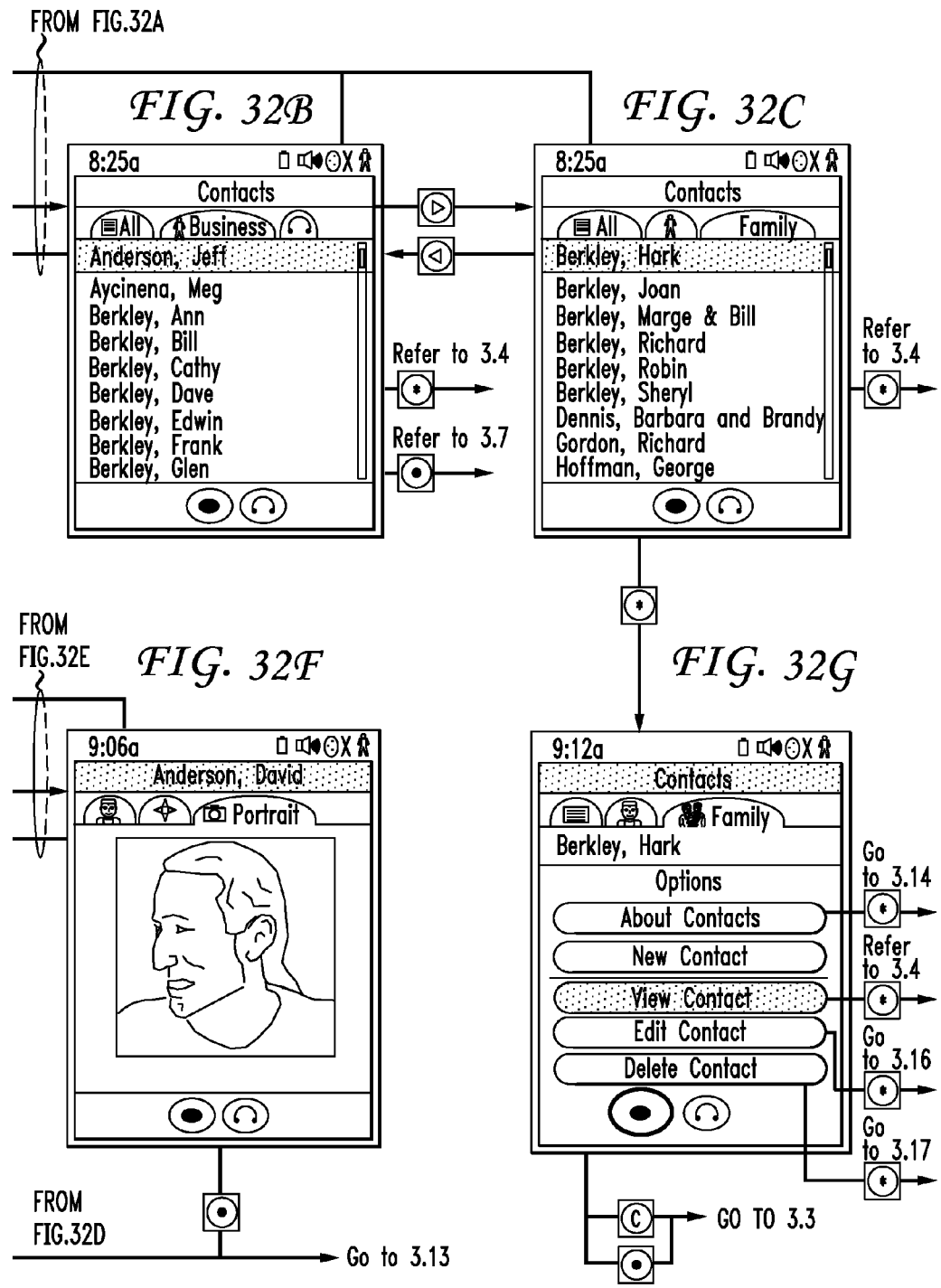

GO TO 3.18
GO TO 3.19
GO TO 3.4

GO TO 3.4

REFER TO 3.18
GO TO 3.3

USER-INTERFACE AND ARCHITECTURE FOR PORTABLE PROCESSING DEVICE

CROSS-REFERENCE TO RELATED APPLICATIONS

This application claims the benefit under 35 U.S.C. §119 (e) of U.S. Provisional Patent Application No. 60/772,160 filed on Feb. 10, 2006 entitled "Improved User-Interface and Architecture for Portable Processing Device," which is herein incorporated by reference.

FIELD OF THE INVENTION

The present invention generally relates to a user interface and a portable processing device architecture for improving user experience and more specifically to a system and method that provides a user with an easy to use, intuitive interface.

BACKGROUND OF THE INVENTION

Existing portable processing devices have interfaces that do not readily permit multi-tasking scenarios. Often users want to utilize a single finger to control the display and application especially in small handheld devices. Existing processing devices, such as, for example, a PDA/voice communication device, may have an interface that does not have one-handed usability and thus may require a user to use both hands when navigating or using applications. Often, one is in a particular application and to exit that application and enter another application there are many steps that need to occur that slow down the process of getting a particular task done. This is because most devices will require the user to exit out of a working application and open a new application to do a separate task, such as look up a contact in a contacts record after having been in a calendar or phone application. Thus, the use of such devices may be awkward for users who are always on the go.

What is needed in the art is an improved interface which simplifies and improves the user experience for navigating applications and interacting with a computing device, such as, for example, a small handheld device.

Therefore, there is a need for an improved interface for interacting with the computing device.

These and other advantages may be provided by various embodiments of the present invention.

SUMMARY OF THE INVENTION

In one embodiment, the present invention provides a computer-implemented method for providing a user interface for interacting with a computing device, said method comprising the steps of: representing an indicator of an application on said computing device in a highlighted state when a user navigates to said indicator; presenting an option panel contextually related to said application when said user selects a panel key on said computing device; and running said application when said user selects an execute key on said computing device.

In another embodiment, the present invention provides an electronic device comprising: a display including indicators for each application executable on said electronic device; and at least one navigation key for navigating among said indicators, wherein said indicators are highlighted when said navigation key activates said indicator, and wherein said indicators displays a contextual panel when said navigation key executes said indicator.

Additional features and advantages of the invention will be set forth in the description which follows, and in part will be obvious from the description, or may be learned by practice of the invention.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIGS. 7A-7B are flowcharts that illustrate an exemplary process that may be implemented in embodiments consistent with the principles of the invention;

FIG. 8 is a flowchart that illustrates another exemplary process that may be implemented in embodiments consistent with the principles of the invention;

FIGS. 28-32 are exemplary display screens that illustrate various features consistent with the principles of the invention.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

Figure 1:
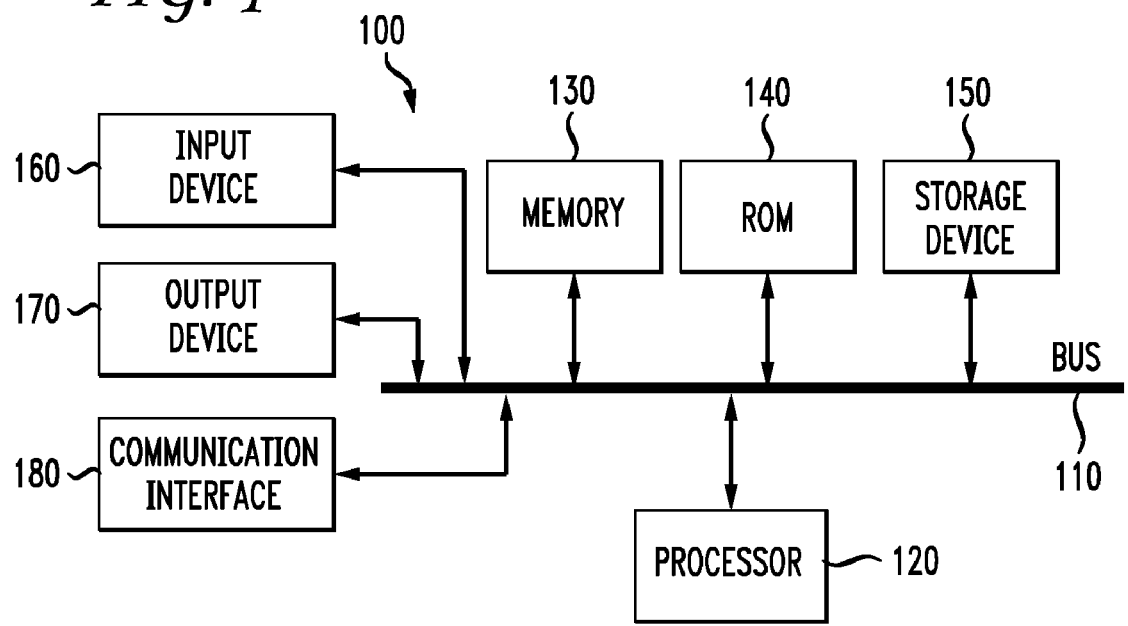
FIG. 1 illustrates an exemplary processing device in which implementations consistent with principles of the invention may execute.

FIG. 1 illustrates a block diagram of an exemplary processing device 100 which may be used to implement systems and methods consistent with the principles of the invention. Processing device 100 may include a bus 110, a processor 120, a memory 130, a read only memory (ROM) 140, a storage device 150, an input device 160, an output device 170, and a communication interface 180. Bus 110 may permit communication among the components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive.

Input device 160 may include one or more conventional mechanisms that permit a user to input information to system 200, such as a keyboard, a pen, a voice recognition device, a microphone, a headset, a digitizer, etc. Output device 170 may include one or more conventional mechanisms that output information to the user, including a display, one or more speakers, a headset, or a medium, such as a memory, or a magnetic or optical disk and a corresponding disk drive. Communication interface 180 may include any transceiver-like mechanism that enables processing device 100 to communicate via a network, such as, for example, a computer network or a telephone network. For example, communication interface 180 may include a modem, or an Ethernet interface for communicating via a local area network (LAN). Alternatively, communication interface 180 may include other mechanisms for communicating with other devices and/or systems via wired, wireless or optical connections.

Processing device 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Figure 2:
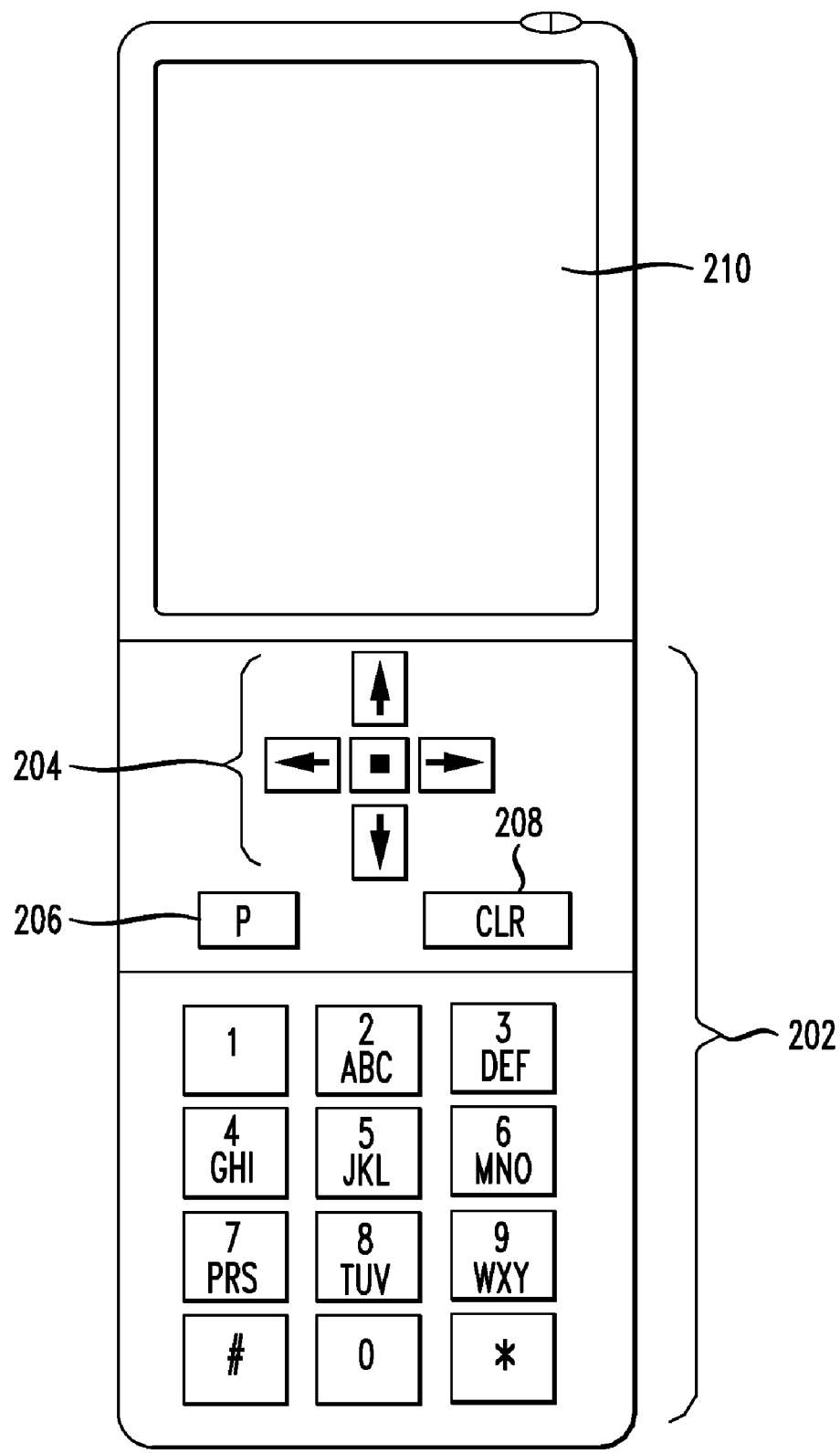
FIG. 2 illustrates an implementation of the processing device of FIG. 1 consistent with principles of the invention.

FIG. 2 illustrates an implementation of exemplary processing device 100 consistent with the principles of the invention. Processing device 100 may include a keyboard 202 and a display 210. The keyboard may further include a group of keys representing numbers, letters, and/or symbols, as well as navigation keys 204, a panel key 206, and a clear/exit (CLR) key 208. In one implementation, the navigation keys may include five keys, a center key, right and left keys, and up and down keys. The use of the keys, in implementations consistent with the principles of the invention, will become obvious from the following descriptions.

Figure 3:
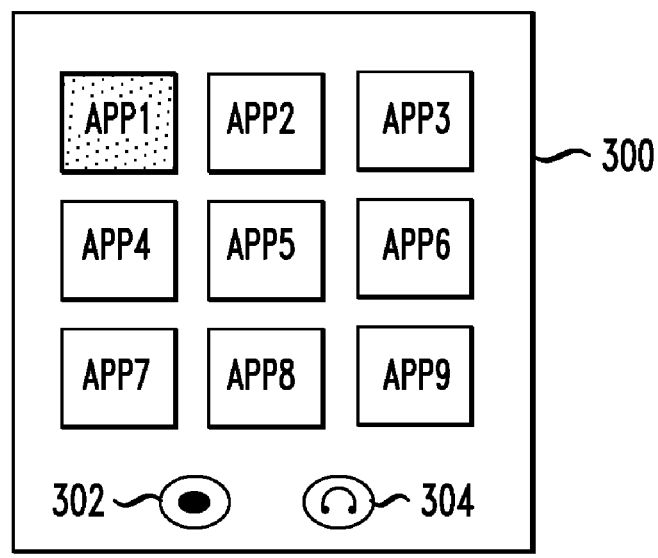
FIGS. 3-6 illustrate generic display screens consistent with the principles of the invention.

FIG. 3 illustrates an exemplary display 300 for processing device 100. Exemplary display 300 may include an indicator or icon for each application that may be executed on processing device 100. A thick line surrounding an indicator for APPI may indicate that a current focus of display 300 is APPI. So, if a user presses an execute key, then the application or function associated with the current focus will be processed by the computing device and present the user with further information or an application associated with the current focus. In other implementations consistent with the principles of the invention, a current focus may be indicated by other means, such as, for example, reverse video, use of a particular color to highlight the current focus, blinking, as well as other means. Any action or command that is input by a user may pertain to the current focus, which in this example is APPI. Icons 302, 304 of display 300 may indicate currently executing applications. For example, icon 302 may indicate that a panel application, for displaying panels with respect to executing applications, is executing, and icon 304 may indicate that a second application, for example, a contacts application, is executing.

Figure 4:
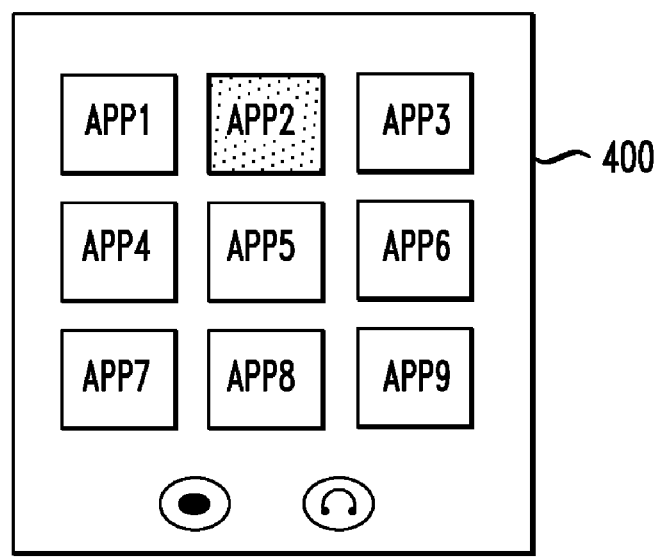

FIG. 4 is an exemplary display 400 for processing device 100, which is similar to display 300, but has a different current focus that display 300. One may change the current focus of a display by using one or more navigation keys 204, such as, for example, $\Rightarrow, \Leftarrow, \Uparrow$, and/or $\Downarrow$. For example, to change the current focus of display 300 to that of display 400, the "$\Rightarrow$" may be used. Of course, other implementations may use other keys to cause a change of focus.

Figure 5A:
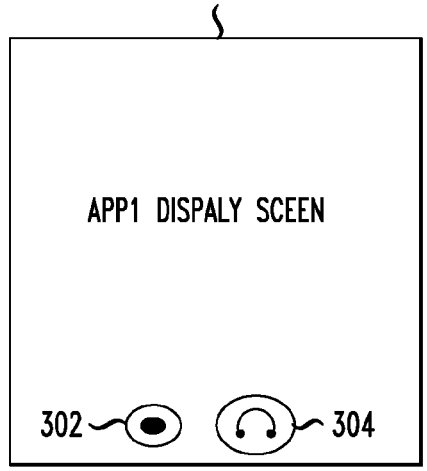

When a user selects an execute key, which may be the center key of navigation keys 204, while the display includes a number of application indicators or icons, such as display 300 of FIG. 3, a display, such as display 500 of FIG. 5A, which pertains to the application indicator or icon that is the current focus of the display, such as APP1 of FIG. 1, is displayed. Icon 304 may be enlarged to indicate that the currently displayed application is the application represented by icon 304. Instead of, or in addition to enlarging icon 304, other techniques may be used for indicating that icon 304 pertains to the currently displayed application. For example, reverse video, specific color highlighting, blinking, as well as other techniques may be used.

Figure 5B:
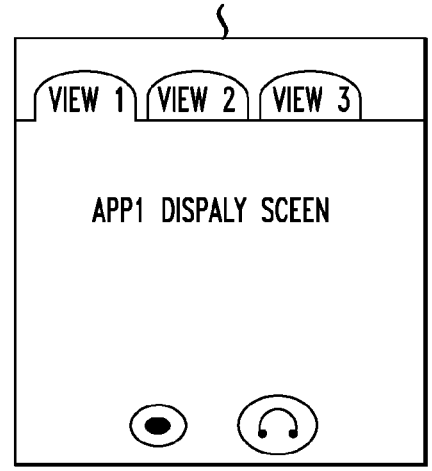

In implementations consistent with the principles of the invention, some applications may include more than one view of the data. Such applications may indicate multiple views by using tabs, as shown in exemplary display 510 of FIG. 5B. Exemplary display 510 has three tabs, representing three views of APPLI data. A user may select a tab to cause a view associated with the selected tab to be displayed. In alternative implementations, buttons, indicators, or icons may be used instead of tabs. Further, a display may have more or fewer tabs than a number of tabs shown in FIG. 5B.

Figure 6:
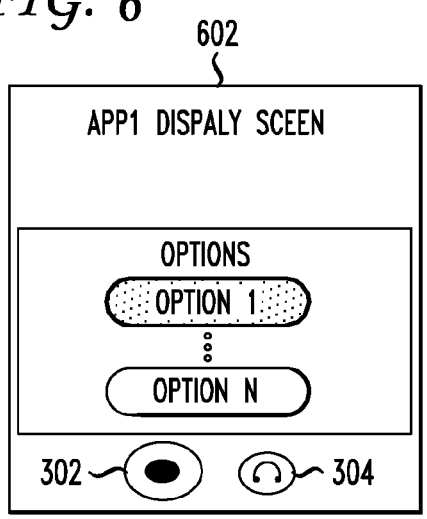

When viewing an application display screen, such as display 500 or 510, or when viewing a display, such as display 300 of FIG. 3, selection of panel button 206 may cause an option panel to be displayed over at least a portion of the current display. FIG. 6 illustrates an exemplary option panel 602. The option panel may be associated with the currently displayed application if viewing an application display, such as display 500 or 510, when panel key 206 is selected. Further, the option panel may be associated with a current focus, if panel key 206 is selected when viewing a display, such as exemplary display 300 or 400. The panel key 206 may provide an opportunity to perform left/right navigation to views of related information and panels of information, which provide non-disruptive access to other information. Related information may be grouped into tabbed views. Each view may be scrollable so that is can present a complete list of information. Up and down buttons can be utilized to scroll through a current view. Using left or right buttons can switch to related views. These may also be switched in that the panels may be up/down navigated. Each view may be a different representation of the same information or a set of related information. For example, one view could be a list of work contacts and a related view is a list of your friends. Each view is scrollable so that is presents a complete list of information.

The use of panels, in implementations consistent with the principles of the invention, may provide a switching capability to allow quick and convenient access to multiple applications. As an example, if one presses the panel key at any time, and the panels opens. From there, you can navigate left and right through the panels to see such information as upcoming appointment, the weather, incoming messages, people available to chat with, and so one. When you have what you need, the user presses the panel key again. The panels lower, and the user is right back where he or she was before using the panels key 206. The first panel that opens is preferably a special case where it displays actions that can be performed in the current activity.

Option panel 602 may include one or more indicators with respect to available options of the application associated with option panel 602. In some cases, option panel 602 may indicate no options if the associated application has no options.

Figure 7B:
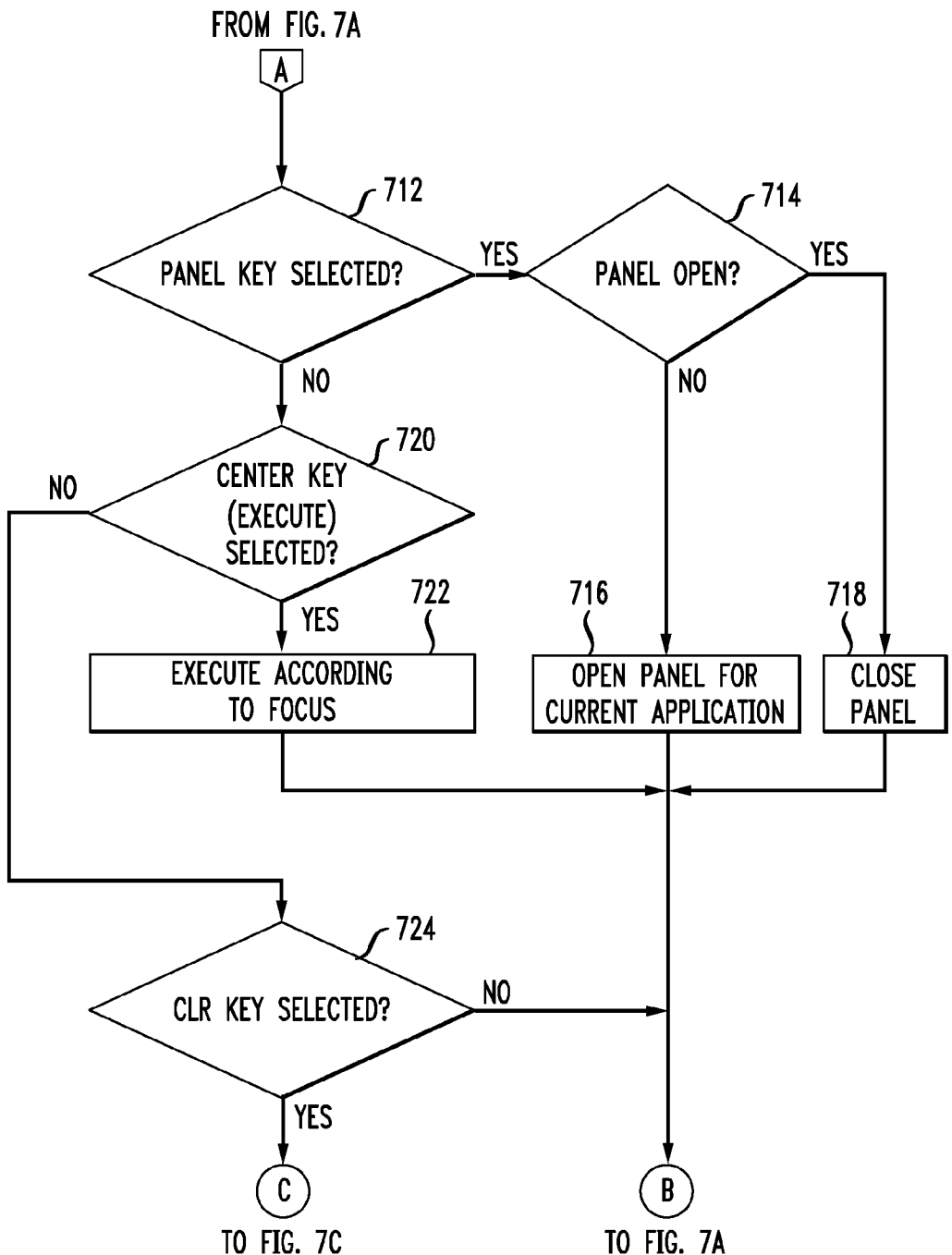

FIGS. 7A through 7C are flowcharts that illustrate exemplary processing in implementations consistent with the principles of the invention. The process may begin by displaying a group of indicators or icons showing available applications, with a current focus on one of the applications, such as display 300 or 400 (act 702). Next, processing device 100 may determine whether a directional navigation key was selected, such as a right key, left key, up key, or down key (act 704). A key or button may be selected by touching an actual key or button or a displayed key (soft key) or button (soft button) with a user's finger, or by touching a displayed key with a stylus or an electronic pen, as well as by other means.

If a directional navigation key was selected, then processing device 100 may determine whether a panel is open and whether the selected key is a right key or a left key (act 706). If a panel is open and the selected key is a right or left key, then the current panel may be closed and a panel for another application may be opened. Otherwise, the current focus may be changed according to which directional navigation key was selected (act 708). Processing device 100 may then repeat act 704.

If, at act 704, processing device 100 determines that a directional navigation key was not selected, then processing device 100 may determine whether panel key 206 was selected (act 712). If panel key 206 was selected and no panel is open, the processing device 100 may open a panel for a current application (act 716). Otherwise, processing device 100 may close the currently open panel (act 718). Processing device 100 may then repeat act 704.

If, at act 712, processing panel determines that panel key 206 was not selected, then processing device 100 may determine whether the center or execute key was selected (act 720). If the center or execute key was selected, then the processing device 100 may execute according to a current focus of a display (act 722). Thus, if one application or task was active, that application may be placed in a background, an application associated with a current focus may become active and a corresponding display may be displayed by processing device 100. The background application or task may again be made active at a later point in time by the user. Processing device 100 may repeat act 704.

If, at act 720, processing device 100 determines that the center key was not selected, the processing device 100 may determine whether CLR key 208 was selected (act 724). If processing device 100 determines that CLR key was selected, then processing device 100 may determine whether CLR key 208 was selected or held for at least a predetermined time period (act 726). The predetermined time period may be at least two seconds or another suitable timer period. If CLR key 208 was selected or held for at least the predetermined time period, then an initial display may be displayed, such as, for example, display 300, which may be called a launcher display (act 728). Otherwise, processing device 100 may display a last shown application display screen (act 730). Processing device 100 may then repeat act 704.

In an alternative implementation consistent with the principles of the invention, when CLR key 208 is held or selected, a next last shown application display screen may be displayed every predetermined time period, such as, for example, every two seconds. For example, assuming that screens 1-3 are application display screens, if screen 1 is displayed, then screen 2 is displayed, followed by screen 3, when CLR key 208 is selected or held continuously, then after the predetermined time period, screen 2 may be displayed. After another predetermined time period, screen 1 may be displayed. In such an implementation, when the user stops selecting or holding CLR key 208, the currently displayed application screen may remain displayed.

Figure 9:
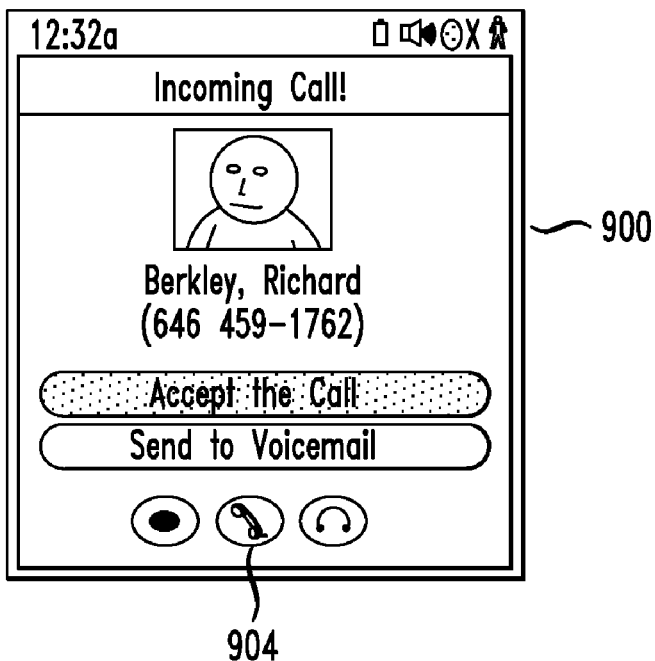
FIGS. 9-27 are exemplary display screens that may be implemented in embodiments consistent with the principles of the invention.

FIG. 8 is a flowchart that illustrates exemplary processing in processing device 100 when a notification is received indicating that an event occurred to which a user may wish to attend, such as, for example, an incoming phone call. The process may begin with processing device 100 determining whether an event notification was received (act 802). If an event notification was received, then processing device 100 may cause a notice or icon to appear on a display screen or may cause a sound to be made, such as, for example, a ringtone, informing the user of an occurrence of an event (act 804). Next, processing device 100 may determine whether a particular key, for example, "*" was selected by the user. If the particular key was selected, then processing device 100 may display a panel over at least a portion of the currently displayed screen (act 808). The displayed screen may have icons or buttons pertaining to one or more options. For example, if the event is an incoming call, after the user selects the particular key, a screen or panel may be displayed requesting the user to indicate whether the incoming call is to be answered or whether the call should be forwarded to voicemail. FIG. 9 shows exemplary display 900, which processing device 100 may display if the event is an incoming call and the particular key was selected. Icon 904 may be displayed indicating the application (a telephone application).

In another implementation consistent with the principles of the invention, if an incoming call event arrives, then the processing device 100 may interrupt whatever the user is doing and may permit the user to answer the call or divert the call by selecting a key. In this implementation, the user need not select a key to display a panel including incoming call information.

Figure 10:
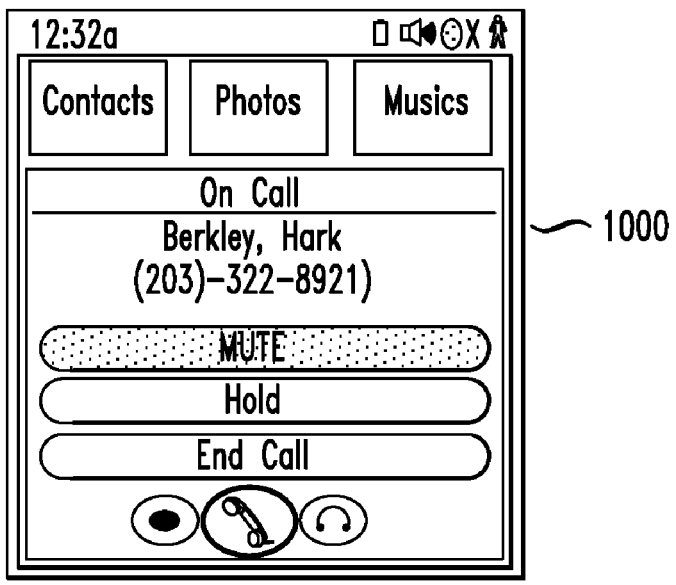

The following provides more specific examples and operations that may be performed by processing device 100 in implementations consistent with the principles of the invention. FIG. 10 illustrates exemplary display 1000, which processing device 100 may display when a user changes a focus to "Accept the Call" of a display, such as, exemplary display 900 and selects an execute button, such as, for example, the center key. Display 1000 illustrates a panel covering at least a portion of a previous display. The panel informs a user of who is calling and may provide the user with one of several options, such as, for example, muting the call, placing the call on hold, and ending the call.

Figure 11:
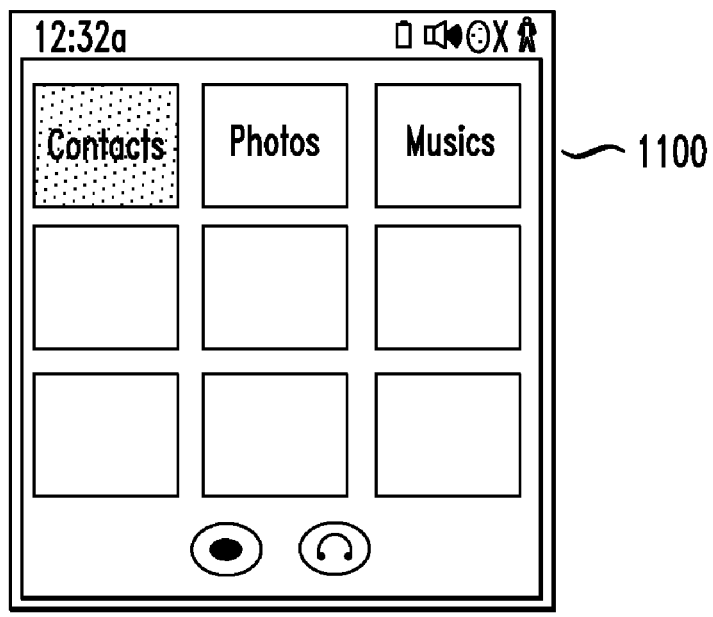

FIG. 11 illustrates an exemplary display 1100 including indicators or icons showing available applications on processing device 100. Display 1100 shows a contacts application, a photos application and a music application.

Figure 12:
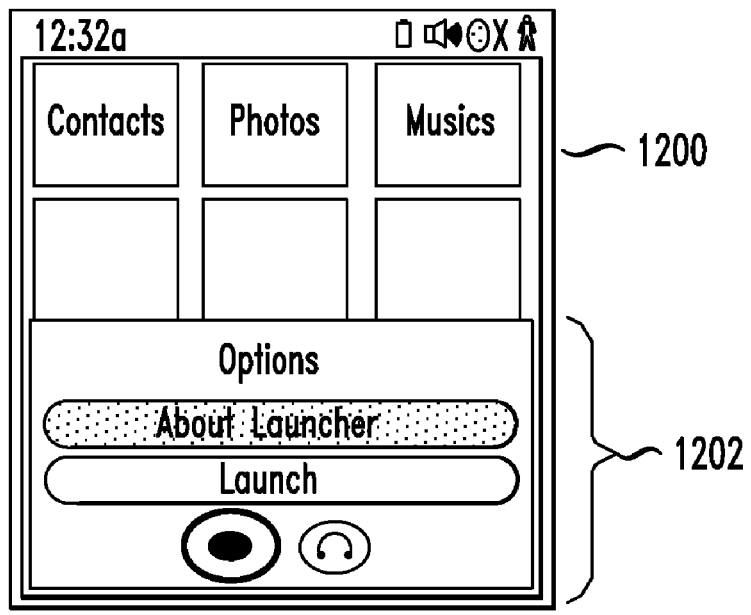

If a user selects panel key 206 while display 1100 is displayed, for example, an option panel 1202, such as shown in FIG. 12, may be displayed by processing device 100. Option panel 1202 may include one or more selections for the user, such as, for example, "about launcher" and "launch". If the user selects "about launcher" by, for example, selecting the execute key while the current focus is "about launcher", then a panel may be displayed that provides information about the launcher. If the user selects "launch" by, for example, selecting the execute key while the current focus is "launch", then an application screen associated with an indicator or icon that is the focus of the display may be displayed.

Figure 13:
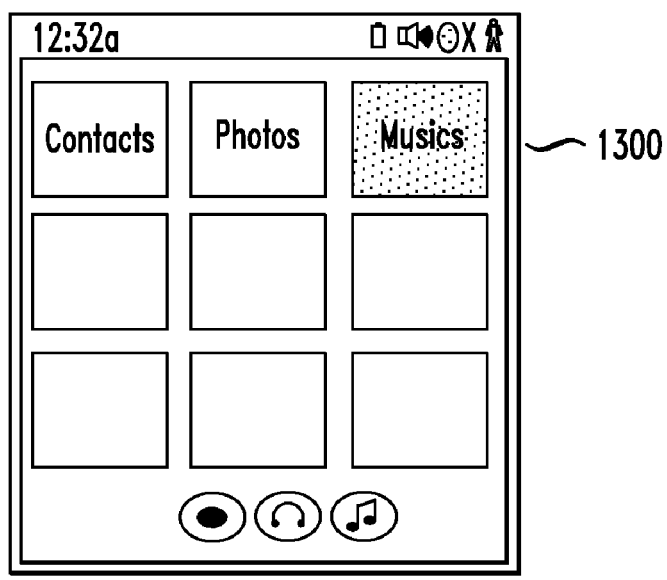
Figure 14:
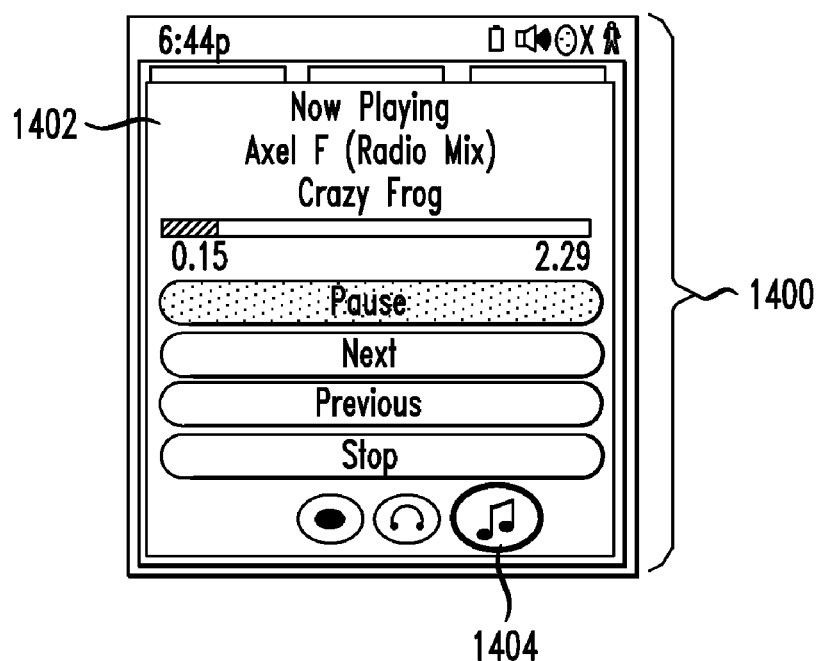

FIG. 13 illustrates an exemplary display 1300, which is similar to display 1100 of FIG. 11, but has a focus on an indicator or icon associated with the music application. If the user selects panel key 206 while processing device 100 displays exemplary display 1300, a panel, such as panel 1402 may be overlaid onto display 1300, as shown by display 1400 of FIG. 14. Panel 1402 may indicate a name of a song that is being played by the music application, a total length of the song, a current progress indicator showing a current playing progress of the song, as well as indicators that may be selected by the user to pause, play a next song, play a previous song, or stop. Icon 1404 may be enlarged in display 1400 to indicate that the music application is playing.

Figure 15:
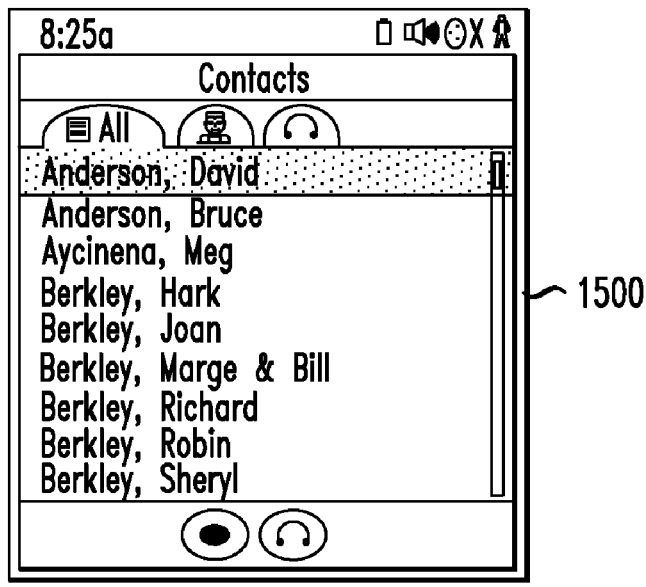

If the user selects the execute button, while a display, such as exemplary display 1100 is displayed by processing device 100, a display, such as exemplary display 1500 of FIG. 15 may be displayed by processing device 100. Exemplary display 1500 shows names of contacts included in the contacts data. Exemplary display 1500 may include a number of tabs 1502, which the user may select to view related data. For example, a tab labeled "all" may be selected to cause all contacts data to be displayed. Another tab may be selected by the user to cause business contacts data to be displayed. A third tab may be selected to cause all family contacts data to be displayed.

Figure 16:
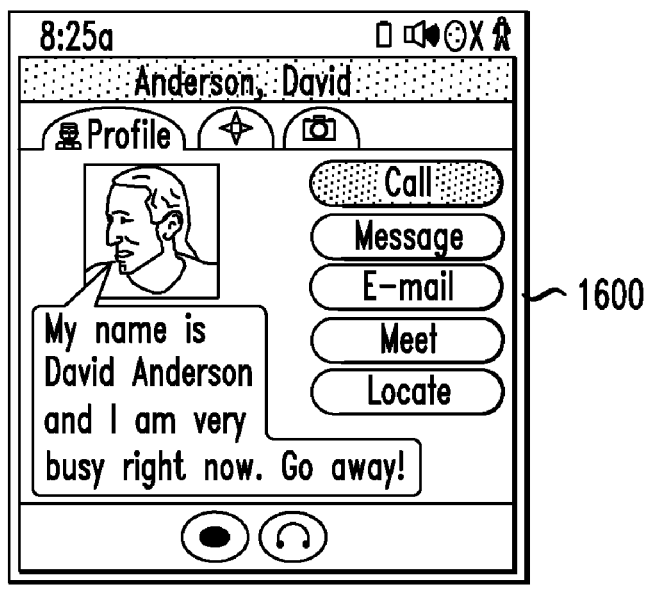

When a user views a display, such as display 1500, and selects execute, a display, such as exemplary display 1600 of FIG. 16 may be displayed by processing device 100. Display 1600 may include contacts data pertaining to the focused item of contact data of display 1500. Display 1600 may include one or more tabs, which, when selected, may cause different or related views of the contacts data to be displayed. For example, selection of one tab may cause a profile to be displayed. The profile may include a photo and a contact profile message. The display associated with the profile tab may include several indicators which may be selected by the user. For example, a call indicator, a message indicator, an e-mail indicator, a meet indicator and a locate indicator may be included in the display.

Figure 17A:
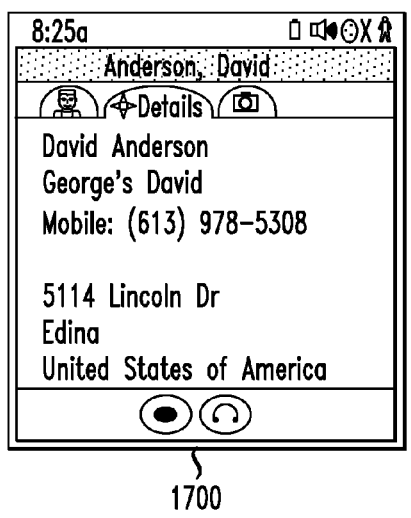

Display 1600 may include a tab, which when selected, may cause detailed contact data with respect to the particular contact, to be displayed, as illustrated by exemplary display 1700 of FIG. 17A. Display 1700 may include contact name, address, and telephone number data. Other data may also be included, such as data pertaining to how the user knows the contact.

Figure 17B:
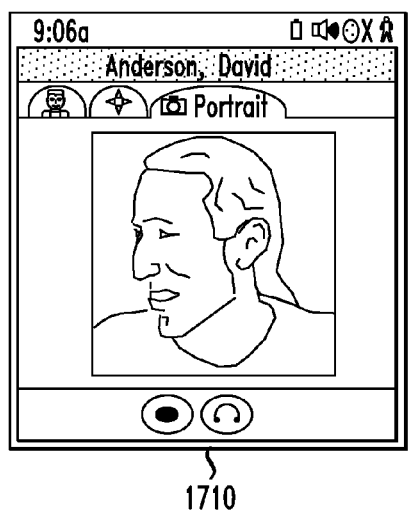

Display 1600 may also include a tab which, when selected, may cause a photo associated with the contact data to be displayed by processing device 100, as illustrated by an exemplary display 1710 of FIG. 17B.

Figure 18:
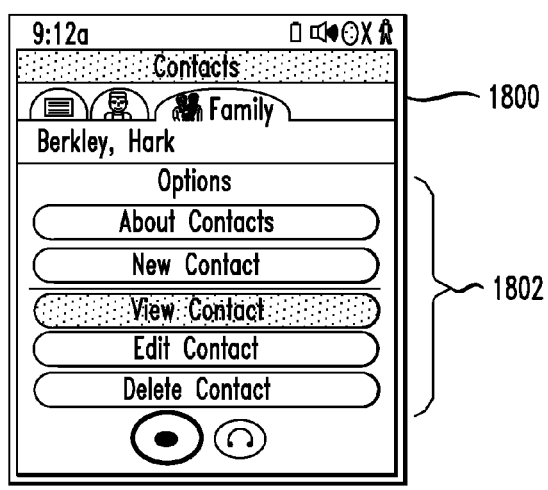

FIG. 18 illustrates an exemplary display 1800, which is a contacts display showing a family view of the contact data. If the user selects panel key 206, while viewing a contacts display, option panel 1802 may be overlaid over at least a portion of the display. In exemplary option panel 1802, the user may be presented with several options including options to: view information about the contacts application, add a new contact, view a contact, edit a contact, and delete a contact.

Figure 19:
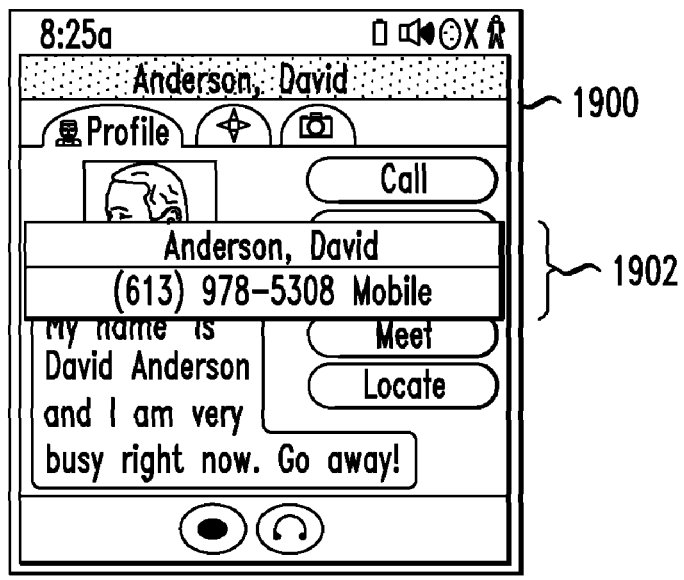

If the user is viewing a display, such as exemplary display 1600 of FIG. 16, with a focus on "call", and he or she selects the execute button, then a display, such as exemplary display 1900 of FIG. 19, may be displayed by processing device 100. The display may include exemplary display 1600 overlaid, at least partially, by panel 1902, which may include a name of a contact as well as a phone number.

Figure 20:
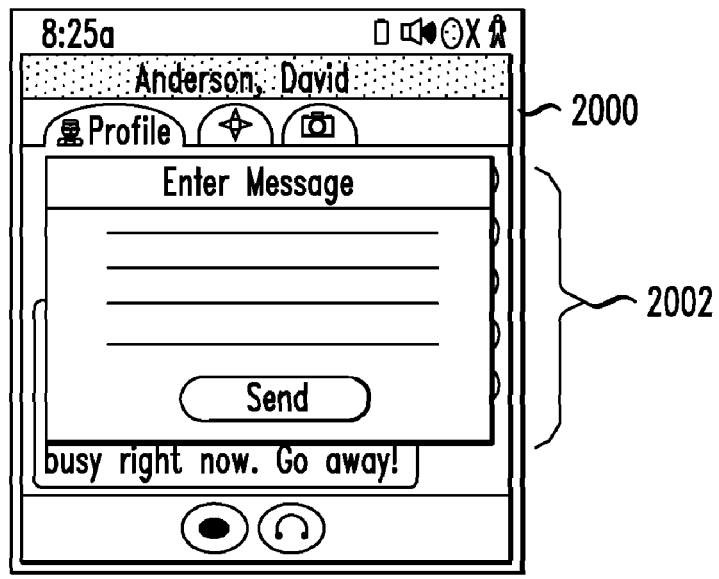

If the user is viewing a display, such as exemplary display 1600 of FIG. 16, but with a focus on "message", and he or she selects the execute button, then a display, such as exemplary display 2000 of FIG. 20, may be displayed by processing device 100. The display may include exemplary display 1600 overlaid, at least partially, by panel 2002, which may include an area for entering a message to be sent, as well as a send indicator, which the user may select by changing a focus to the send indicator and selecting the execute button in order to send the message. In implementations consistent with the principles of the invention, the message may be sent as a text message to a contact's phone number.

Figure 21:
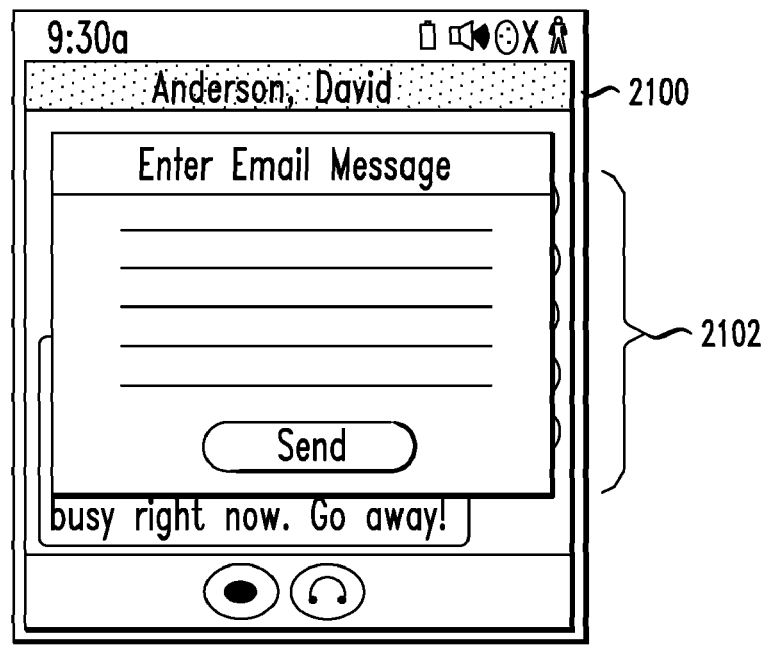

If the user is viewing a display, such as exemplary display 1600 of FIG. 16, but with a focus on "email", and he or she selects the execute button, then a display, such as exemplary display 2100 of FIG. 21, may be displayed by processing device 100. The display may include exemplary display 1600 overlaid, at least partially, by panel 2102, which may include an area for entering a message to be sent via email, as well as a send indicator, which the user may select by changing a focus to the send indicator and selecting the execute button in order to send the message. In implementations consistent with the principles of the invention, the message may be sent to an email address included in the contact information for a selected contact.

Figure 22:
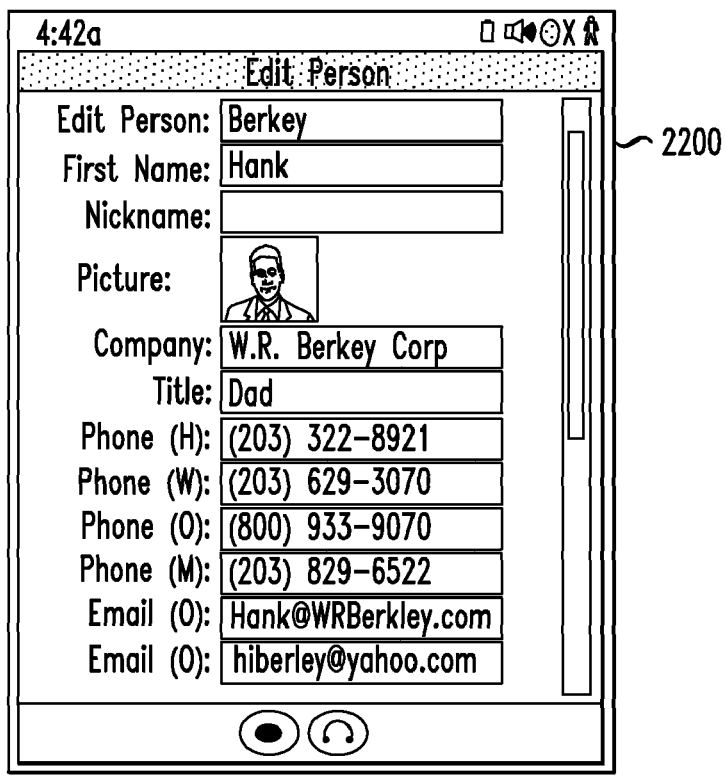

If the user is viewing a display, such as exemplary display 1800 of FIG. 18, with a panel, such as panel 1802, but with a focus on "edit contact", and he or she selects execute, then a display, such as an exemplary display 2200 of FIG. 22 may be displayed by processing device 100. Display 2200 may include contact data fields, such as, for example, last name, first name, nick name, a photo, company name, tide, home phone number, work phone number, other phone number, mobile phone number, and one or more office email addresses.

Figure 23:
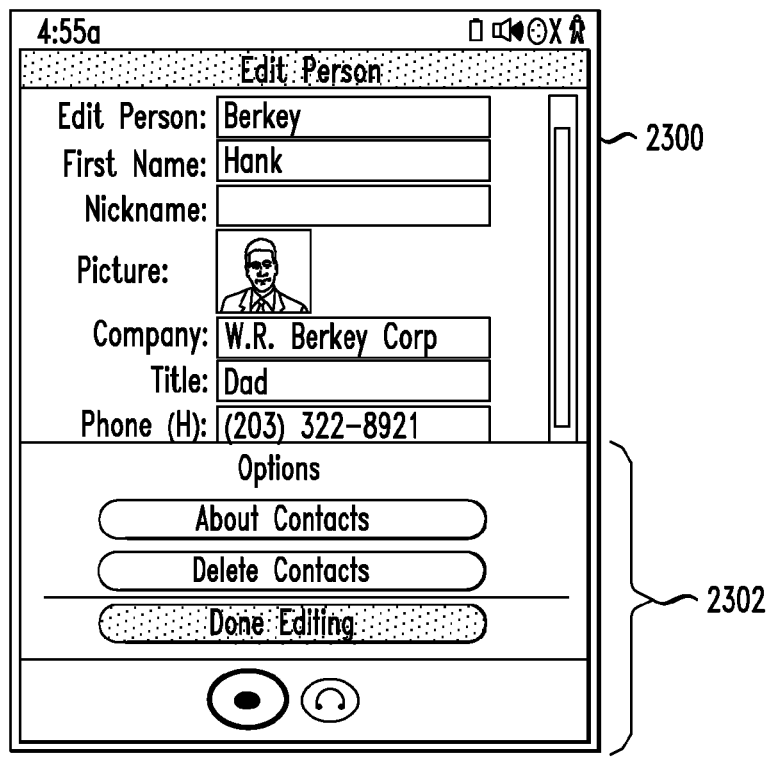

If the user is viewing a display, such as display 2200 of FIG. 22, and he or she selects panel key 206, then a display, such as exemplary display 2300 of FIG. 23 may be displayed by processing device 100. Display 2300 may include display 2200 overlaid, at least partially, by option panel 2302, which may include indicators which the user may select to: view information about the contacts application, delete a current contact, and exit editing of the current contact.

Figure 24:
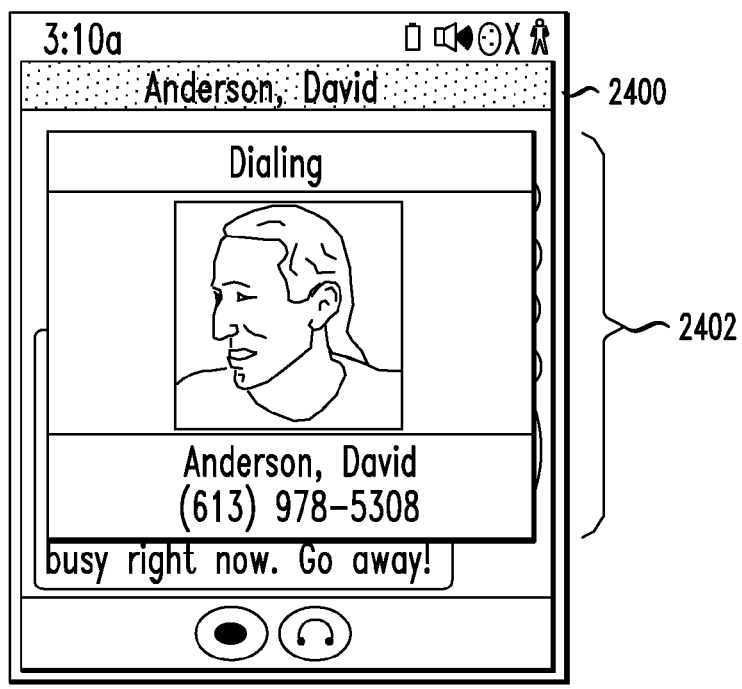

If the user is viewing a display, such as exemplary display 1900 of FIG. 19, and he or she selects execute, then a display, such as exemplary display 2400 of FIG. 24 may be displayed by processing device 100. Display 2400 may include display 1600 of FIG. 16 overlaid, at least partially, by panel 2402, which may include a photograph of the contact being called, along with an indication that dialing is now occurring.

Figure 25:
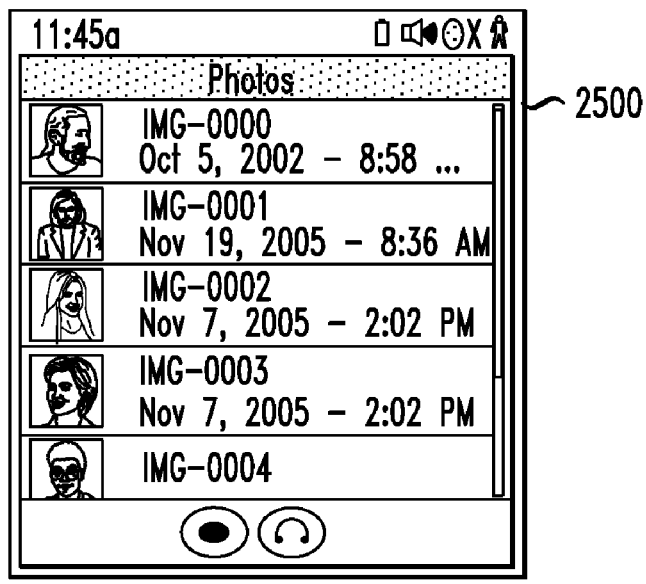

If the user is viewing a display, such as exemplary display 2200 of FIG. 22, and he or she selects execute while a current focus is on a photograph included in display 2200, then a display, such as exemplary display 2500 of FIG. 25 may be displayed by processing device 100. Display 2500 may include one or more photographs, with a current focus on a photograph corresponding to the photograph included in display 2200. The user may use navigation keys, $^A$ or v to change the focus to another photograph of display 2500. Upon selecting panel key 206, an option panel may be overlaid, at least partially, over display 2500, and may provide options for the user to: display information about the photograph, choose to associate the photograph with the contact data of display 2200, or display a larger version of the photograph. The user may select one of the options by using one of navigation keys, $^A$, or v, to change the focus to a desired option and select execute.

Figure 26:
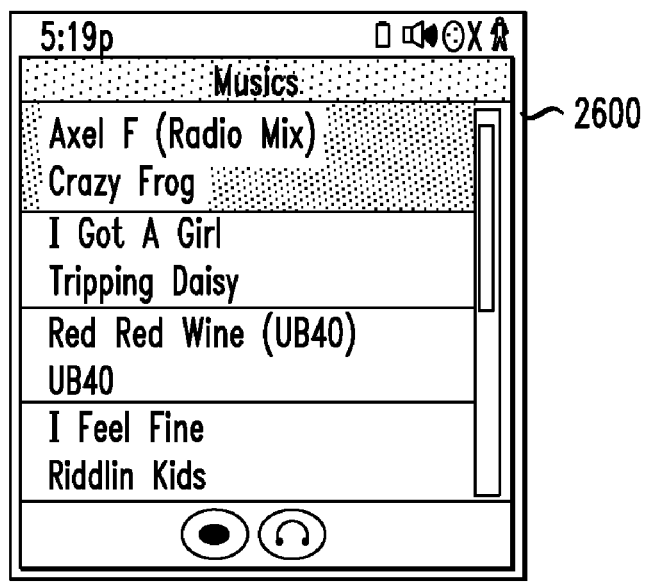
Figure 27:
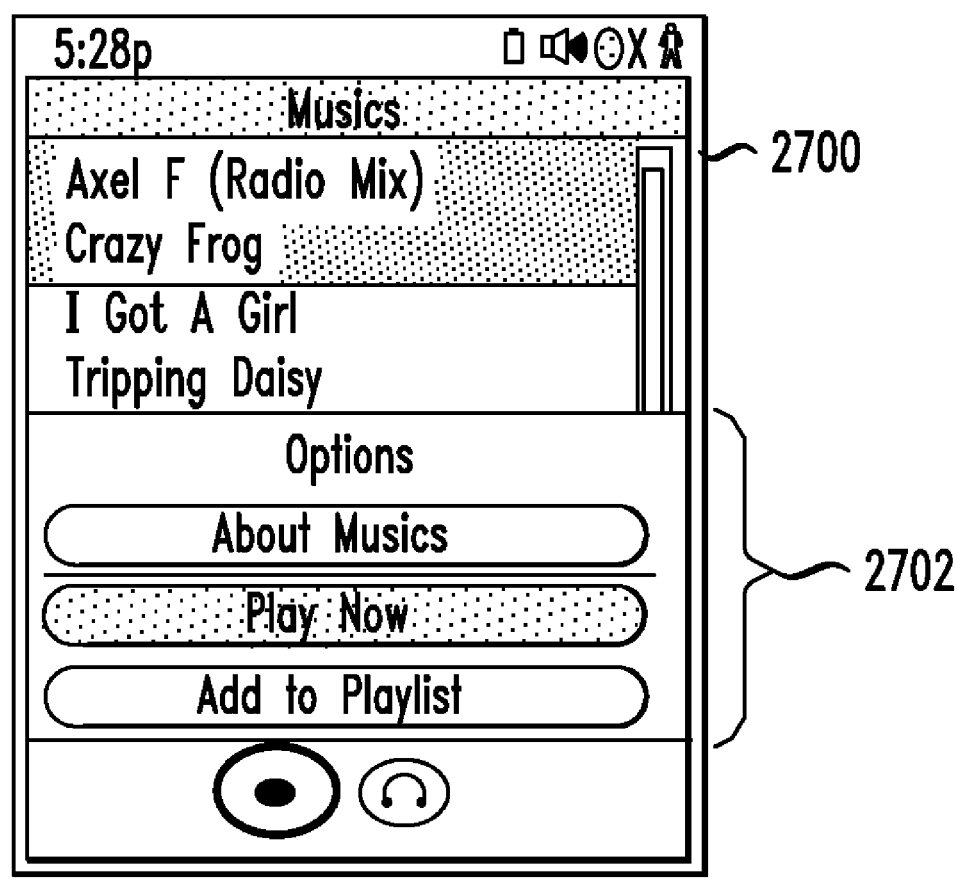

If the user is viewing a display, such as exemplary display 1300 of FIG. 13, and he or she selects execute while a current focus is on music in display 1300, then a display, such as exemplary display 2600 of FIG. 26 may be displayed by processing device 100. Display 2600 may include a list of one or more musical selections available for the user to play. In some implementations, the selections may also include non-musical selections, such as, for example, news reports, talk shows, etc. The user may use navigation keys, ⇑or⇓ to change the focus to another musical or non-musical selection of display 2600. Upon selecting panel key 206, an option panel may be overlaid, at least partially, over display 2600, and may provide options for the user to: display information about a musical or non-musical selection, play a current focused selection, or add the current focused selection to a playlist. Display 2700 of FIG. 27 illustrates exemplary display 2700 showing display 2600 overlaid, at least partially, by option panel 2702, which may provide the above-mentioned options.

If the user selects execute, while viewing a display, such as exemplary display 2600, then a display, such as exemplary display 1400, having panel 1402, may be displayed by processing device 100.

With respect to the figures that follow, key selections are shown by the symbols ⊕, ∅, ⇒, ⇐, ⇑,⇓, and © which represent, respectively, the execute key, panel key 206, right key, left key, up key, down key and CLR key 208. The figures indicate various actions and/or displays that may be presented as a result of the key selections.

Figure 28:
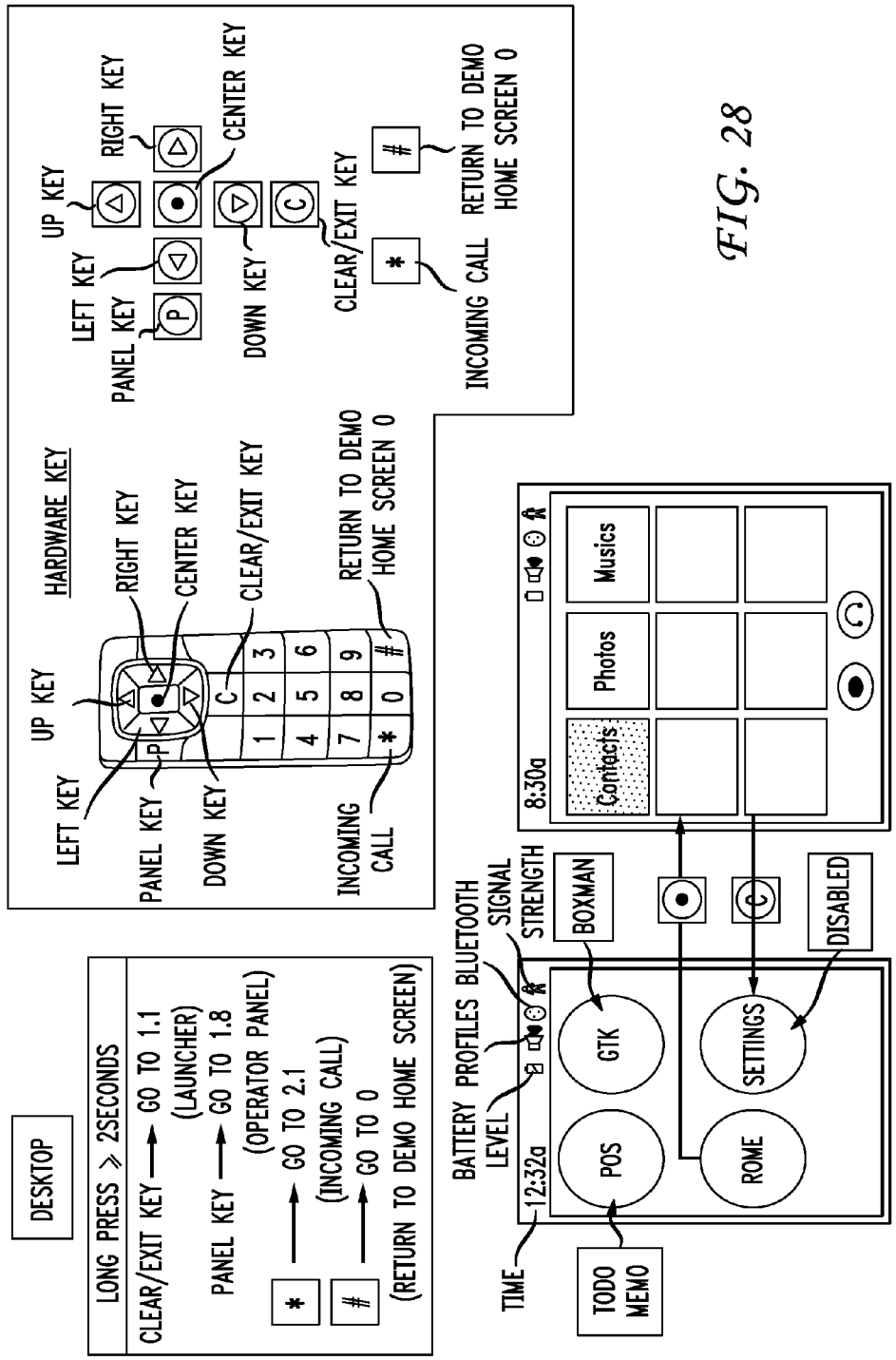

FIG. 28 illustrates an exemplary keyboard for an implementation of processing device 100 consistent with the principles of the invention. FIG. 28 illustrates a 5-way rocker, which may include functionality of a left key, a right key, an up key, a down key, and a center or execute key. The keyboard may also include a clear/exit (CLR) key and an incoming call key ("*"). CLR key may function as a BACK key. In one implementation consistent with the principles of the invention, a long selection of CLR key causes a launcher display screen to be displayed by processing device 100.

FIG. 29 illustrates a display screen of a launcher application. FIG. 29 is the same as FIG. 11. As shown in FIG. 29, a user selecting panel key 206 while the focus is on contacts, may cause the contacts application to become active and a contacts display to appear on a display screen of processing device 100. The user selecting panel key 206 while the focus is on photos, may cause the photos application to become active and a photos display to appear on the display screen of processing device 100. The user selecting panel key 206 while the focus is on music, may cause the music application to become active and a music display to appear on the display screen of processing device 100.

If the user selects right key while processing device 100 is displaying a display, such as shown in FIG. 29, then the focus may be changed to a next application on the right, as illustrated by FIG. 30, which shows the photos application as a new focus. If the user selects left key while viewing a display, such as FIG. 29B, then the focus may move to the left as illustrated by FIG. 29A, which shows contacts as the focus.

Similarly, if the user selects right key while processing device 100 is displaying a display, such as shown in FIG. 29B, then the focus may be changed to a next application on the right, as illustrated by FIG. 29C, which shows the music application as a new focus. If the user selects left key while viewing a display, such as shown in FIG. 29C, then the focus may move to the left as illustrated by FIG. 29B, which shows photos as the focus.

If the user selects panel key 206 while processing device 100 displays a display, such as, shown in FIG. 29A, then an option panel may appear over at least a portion of the display with "about launcher" as a current focus. FIG. 29D corresponds to FIG. 12 discussed previously. To change the focus from "about launcher" to "launch" the user may select the down key while processing device 100 displays a display, such as shown in FIG. 29D. If the user selects the left key while processing device 100 displays a display, such as shown in FIG. 29E, the focus may be changed from "launch" to "about launch". Selecting panel key 206 while processing device 100 displays a display, such as shown in FIG. 29D may cause the contacts application to become active and a contacts display to appear on a display screen of processing device 100. Selecting CLR key 208 while processing device 100 displays a display, such as shown in FIG. 29D, may cause a last displayed screen, such as shown in FIG. 29A to be displayed by processing device 100. Selecting panel key 206 while processing device 100 displays a display screen, such as shown in FIG. 29D, may cause a display, such as shown in FIG. 29A to be displayed by processing device 100.

Selecting the execute key while processing device 100 is displaying a display screen, such as shown in FIG. 29E may cause processing device 100 to change the display screen to one, such as shown in FIG. 29F, which displays information about the launcher application. Selecting either the execute key or CLR key 208 at this point may cause processing device 100 to display a display screen, such as shown in FIG. 29A. Selecting panel key 206 while processing device 100 is displaying a display screen, such as shown in FIG. 29F may cause processing device to display a panel indicating no options, as shown in FIG. 30A, if the launcher has no options.

If the user selects panel key 206, the execute key, or CLR key 208 while processing device 100 is displaying a display screen, such as shown in FIG. 30A, then processing device 100 may display a display screen, such as previously shown in FIG. 29F. If the user selects right key while processing device 100 is displaying a display screen, such as shown in FIG. 30A, then processing device 100 may display a display screen, such as shown in FIG. 30B, which may be a persistent display panel. The persistent display panel may be configured to display items that can be modified by a service provider or carrier, such as local weather or how to download ring tones. The display of FIG. 30B is one example of a persistent display screen. Implementations consistent with the principles of the invention may include more than one persistent display screen. Selecting panel key 206 or CLR key 208 while processing device 100 is displaying a display screen, such as shown in FIG. 30B, may cause processing device 100 to display a display screen, such as previously shown in FIG. 29F.

If processing device 100 is displaying a display screen, such as shown in FIG. 30A including a panel for the launcher application, and the user selects one of panel key 206, the center or execute key, or CLR key 208, processing device 100 may change the display screen to one, such as shown in FIG. 29F. If, instead, the user selects the right directional navigation key, then the processing device 100 may close the current panel and open another panel, such as a persistent display panel, shown in FIG. 30B, which may include time and date, local weather information, and information that may be modified by the service provider or carrier, such as, for example, how to obtain ringtones.

If processing device 100 is displaying a display screen, such as shown in FIG. 30B and the user selects the left directional navigation key, processing device 100 may close the current panel and open a panel for another application, such as, for example, a launcher panel. If, instead, the user selects CLR key 208 or panel key 206, then processing device 100 may display a screen a display screen, such as shown in FIG. 29F.

If processing device 100 is displays a display screen, such as, for example, a launcher display with a focus on the contacts application, as shown in FIG. 30C, and an incoming call event is received, as may be indicated by a telephone icon appearing at the bottom of the display, selection of panel key 206 followed by the right key may cause processing device 100 to open and display a panel for a phone application. The panel may include a name and phone number of a calling party, as well as options for "mute", "hold", and "end call".

Figure 30E:
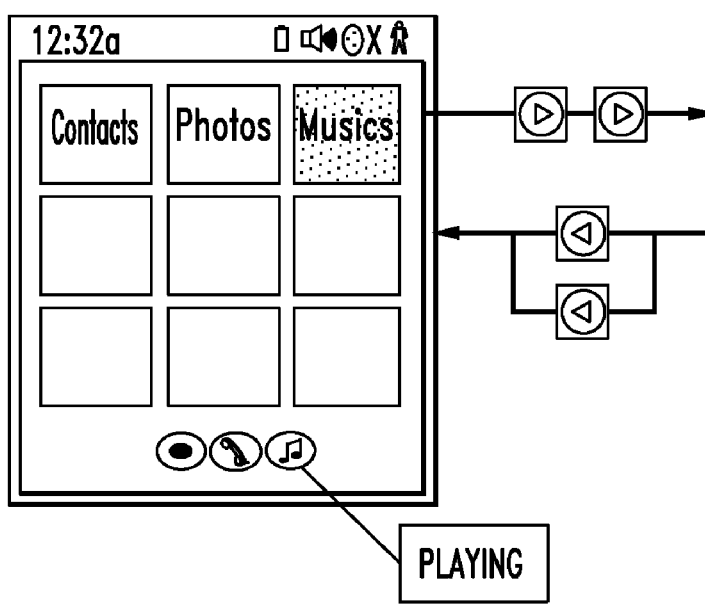
Figure 30F:
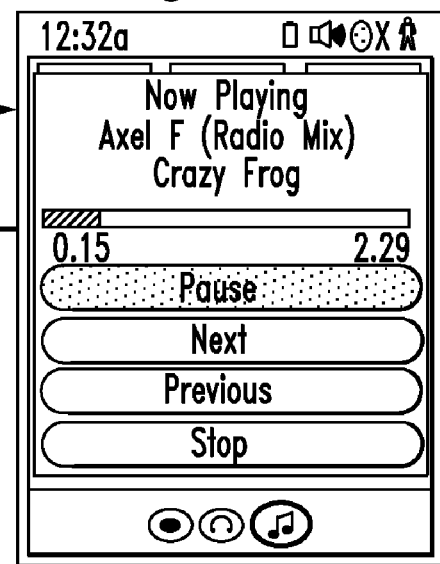

If processing device 100 displays a screen, such as a launcher screen with a focus on the music application, as shown in FIG. 30E, the selection of panel key 206 followed by two selections of the right key may cause processing device 100 to open a panel for an application, such as the music application, as shown in FIG. 30F. The panel may include a name of a currently playing song, a name of a performer or group, and options, such as, for example, "pause", "next", "previous", and "stop".

If processing device 100 indicates an incoming call, for example, by a display notification, a sound, a vibration, or other means, the user may attend to the call by selecting a particular key, such as, for example, "*", as shown in FIG. 31A. In some implementations consistent with the principles of the invention, the user need not select the particular key to attend to the call. A display may be presented by processing device 100 providing the user with an option to accept the call or send the call to voice mail. If the user then selects the execute button while the focus is on "accept the call", processing device 100 may display a display screen, such as shown in FIG. 31B, which may include a panel with options for muting the call, placing the call on hold, or ending the call. If the user, instead, selects the execute button while the display, such as shown in FIG. 31A on the display screen of processing device 100, with the focus on "send to voicemail", then the call is transferred to voicemail and processing device 100 may be disconnected from the call.

If a display screen, such as shown in FIG. 31B is displayed by processing device 100 and the focus is on "mute", then selecting the execute key may cause the call to be muted and "mute" to be changed to "turn off mute". If the focus is on "hold" when the execute key is selected, then processing device 100 may change "hold" to "active" and may resume the call. If the focus is on "end call", then selecting the execute button may cause the call to be ended and the panel closed. If the user selects either CLR key 208 or panel key 206, then processing device 100 may close the panel.

If processing device 100 displays a display screen, such as shown in FIG. 31C, with an enlarged panel indicator, selection of panel key 206 may cause processing device 100 to change the display to one such as shown in FIG. 31A, with the palm panel icon the same size as other icons.

When processing device 100 is displaying a display screen, such as shown in FIG. 29A with the focus on contacts, and the user selects the execute key, then processing device 100 may change the display screen to one, such as shown in FIG. 32A, which lists all contacts. FIG. 32A is the same as FIG. 15 and includes a number of tabs for different views. If the user then selects right key, then processing device 100 may change the display focus from "all" to "business", as shown in FIG. 32B. If the user selects panel key 206 while processing device 100 displays a screen such as shown in FIG. 32A, then processing device 100 may display a screen, such as shown in FIG. 32G (see FIG. 18), which has an option panel that provides the user with a number of options.

When processing device 100 is displaying a display screen, such as shown in FIG. 32B with the focus on the business tab, and the user selects the execute key, then processing device 100 may change the display screen to one, such as shown in FIG. 32D (see FIG. 16). While a display screen, such as that shown in FIG. 32B is displayed, if the user selects left key, then processing device 100 may change the display focus from "business" to "all", as shown in FIG. 32A. If the user selects panel key 206 while processing device 100 displays a screen such as shown in FIG. 32B, then processing device 100 may display a screen, such as shown in FIG. 32G (see FIG. 18), which has an option panel that provides the user with a number of options. If the user, instead, selects the execute key, then processing device 100 may show a display screen, such as shown in FIG. 32D. if the user selects right key while a screen, such as FIG. 32B is displayed, then processing device 100 may change the display focus from "business" to "family", as shown in FIG. 32C.

FIGS. 32D through 32H correspond to FIGS. 16, 17A, 17B, 18 and 19, respectively.

Figure 32H:
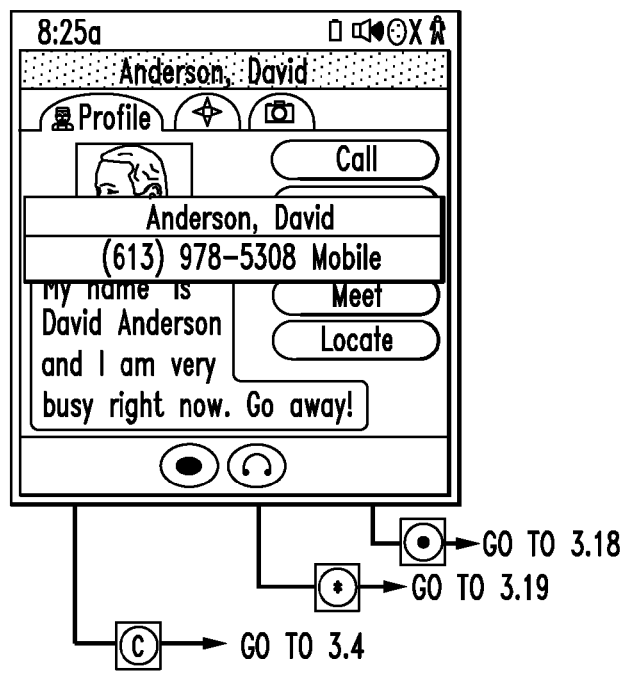
Figure 32M:
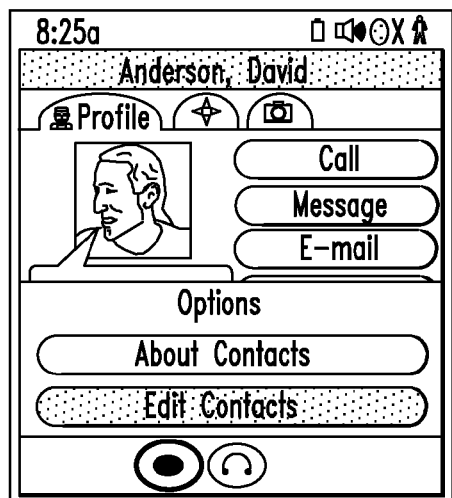
Figure 32N:
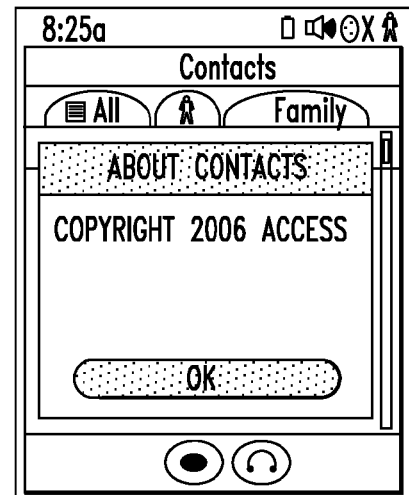
Figure 32P:
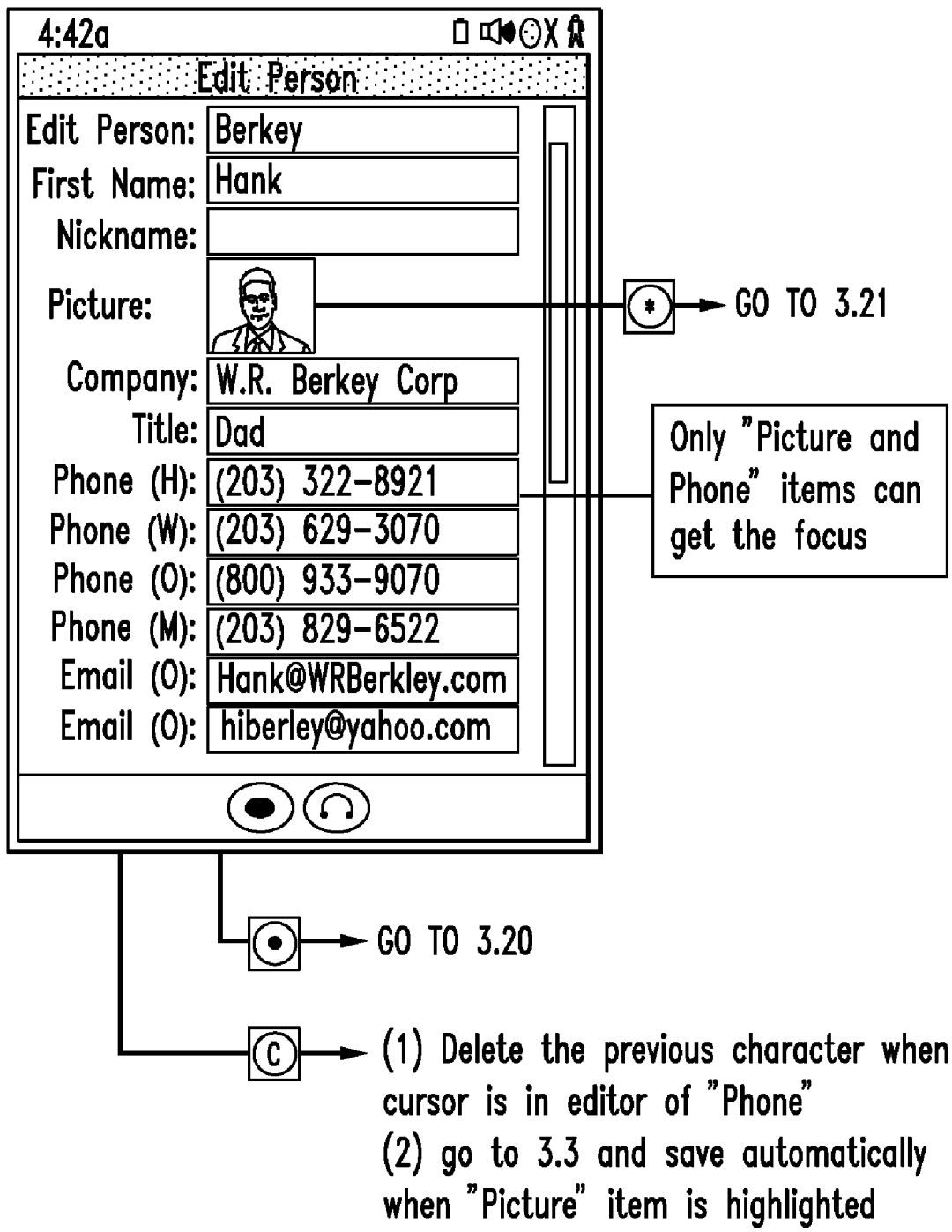

FIG. 32M illustrates a display screen that may be displayed when panel key 206 is selected while a display screen, such as shown in FIG. 32D, is displayed by processing device 100. FIG. 32M shows an option panel that may include options such as "about contacts" for displaying information about the contacts application, and "edit contact" for permitting editing of contact information. If the focus is on "about contacts" and the user selects the execute button, then a display that shows information about the contacts application may be presented by processing device 100, such as shown in FIG. 32N. If the focus is on "edit contacts" and the user selects the execute button, then a display that permits editing of the contact information, such as shown in FIG. 32P (see FIG. 22), may be presented by processing device 100.

Figure 32Q:
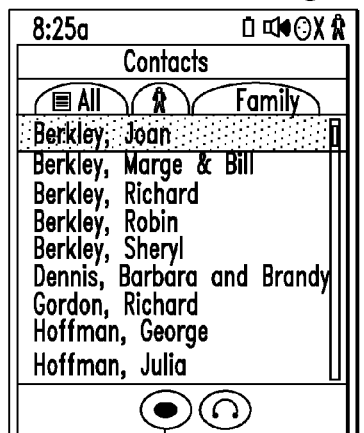
Figure 32R:
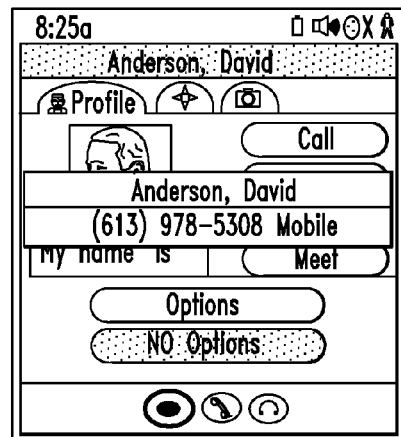
Figure 32S:
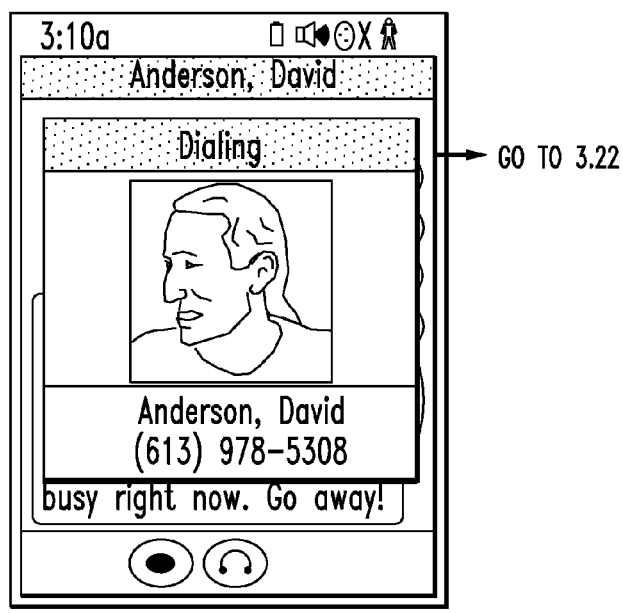
Figure 32T:
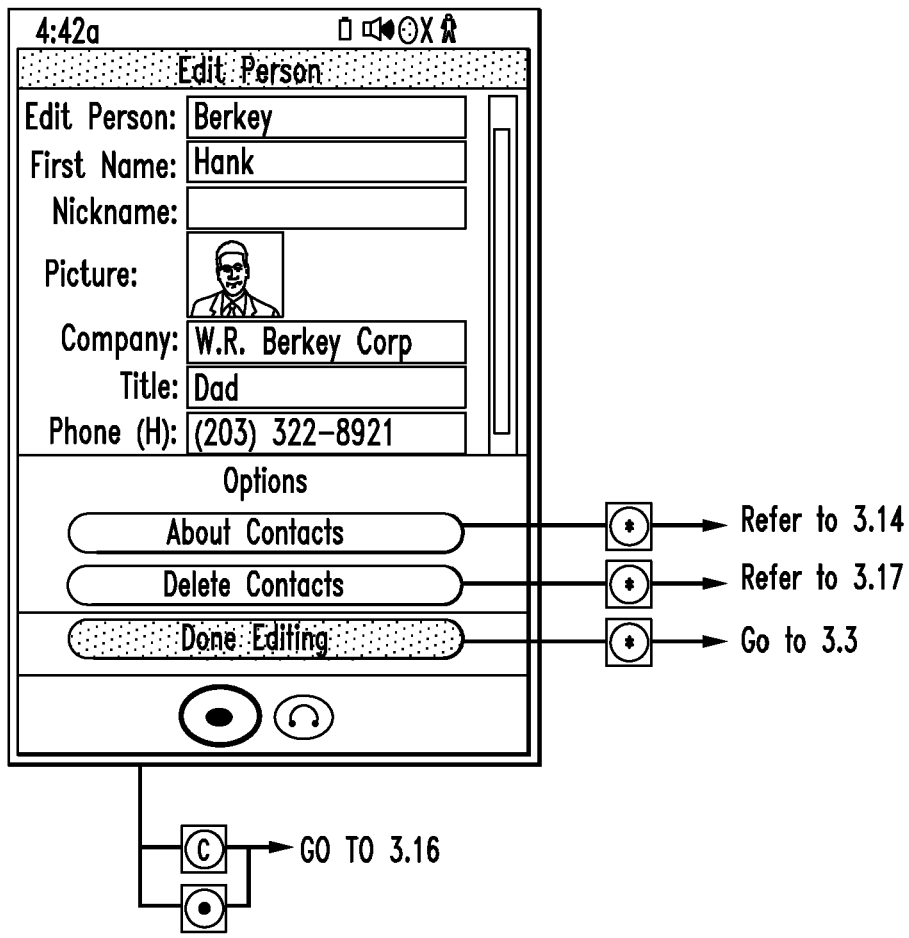
Figure 32U:
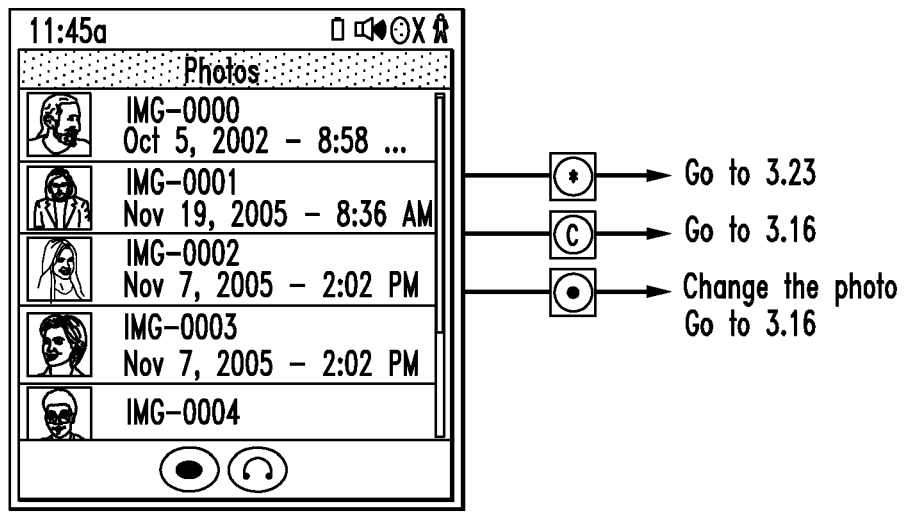
Figure 32V:
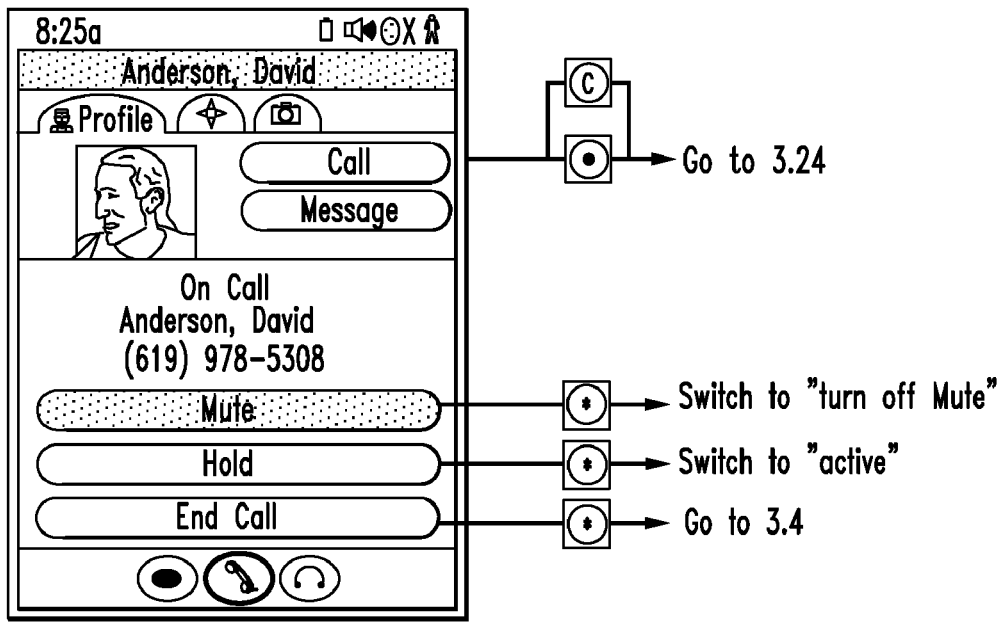
Figure 32W:
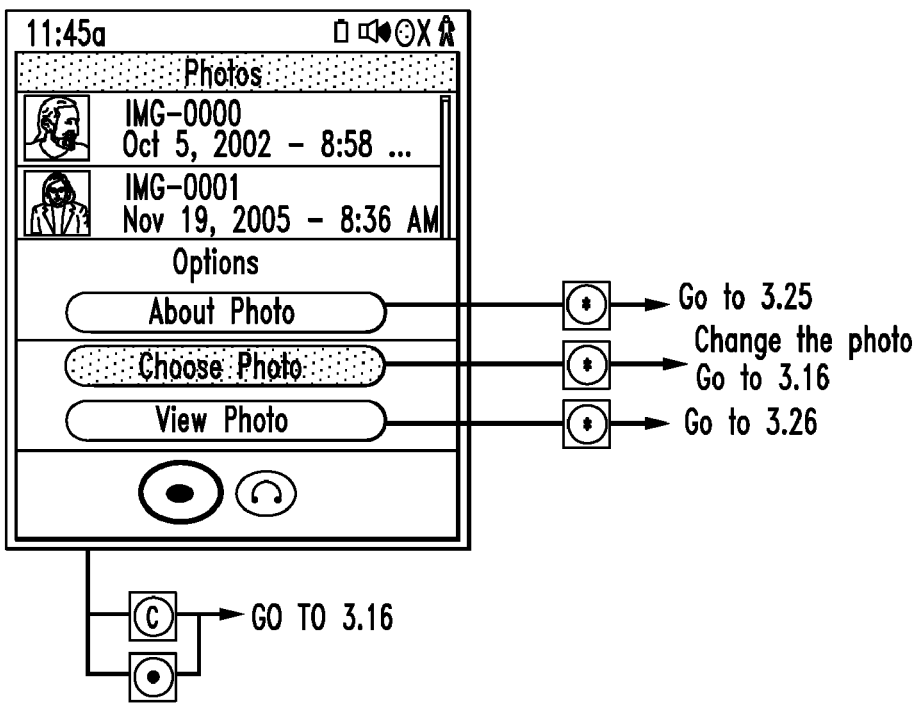

FIG. 32Q illustrates an exemplary family view of a contacts display. FIG. 32R shows an exemplary result of selecting panel 206 when a display, such as shown in FIG. 32H, is displayed. FIG. 32S shows an exemplary result of selecting the execute key when a display, such as shown in FIG. 32H, is displayed. FIG. 32T shows an exemplary result of selecting panel 206 when a display, such as shown in FIG. 32P, is displayed. FIG. 32U shows an exemplary result of selecting the execute key when a display, such as shown in FIG. 32P, is displayed. FIG. 32V shows an exemplary result of a call being connected after the call is dialed, as shown in FIG. 32S. FIG. 32W shows an exemplary result of selecting panel 206 when a display, such as shown in FIG. 32U, is displayed.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A computer-implemented method for providing a user interface for interacting with a computing device with a panel key, an execute key, a set of navigation keys on the computing device, said method comprising the steps of:

displaying on a display screen of a computing device an indicator for each executable panel application on said computing device, wherein said display of each executable panel application is unobstructed;

representing one of said indicators of an application on said computing device in a highlighted state when a user navigates to said one indicator;

selecting a key on said computing device, wherein said key is selected from the group of a panel key, an execute key, and a navigation key;

determining an action, wherein the action is based on said key pressed and a status of an option panel, wherein the action is selected from the group of:

upon selecting a panel key and said status indicates no option panel is open, displaying on said computing device an option panel contextually related to said application represented by said one indicator, wherein said option panel comprises one or more additional indicators with respect to available options of said application;

upon selecting a panel key and said status indicates an open option panel, closing said open option panel;

upon selecting a navigation key and said status indicates an existing option panel is open, closing existing option panel, and displaying on said computing device another option panel contextually related to another one of said applications executable on said computing device, wherein said another option panel comprises one or more additional indicators with respect to available options of said another one of applications; and upon selecting an execute key and regardless of status of said option panel, executing on said computing device said application indicated in a highlighted state.

2. The method in accordance with claim 1, further comprising the step of:

representing one of said first indicators in a non-highlighted state when said user selects a clear key on said computing device.

3. The method in accordance with claim 1, wherein said computing device is a mobile device.

4. The method in accordance with claim 1, wherein said computing device is a portable telephone.

5. The method in accordance with claim 1, wherein said highlighted state is an enlarged icon.

6. The method in accordance with claim 1, wherein said highlighted state is a reverse video icon.

7. The method in accordance with claim 1, wherein said application is a telephone application.

8. The method in accordance with claim 1, wherein said option panel comprises contextual tabs.

9. The method in accordance with claim 8, wherein said contextual tabs are scrollable.

10. An electronic device comprising:

a display including indicators for each panel application executable on an electronic device wherein each executable panel application is unobstructed; and at least one navigation key for navigating among said indicators wherein a user selects said at least one navigation key, wherein said indicators are highlighted when said navigation key activates said indicator, and wherein one or more contextual panels are displayed when said navigation key is selected while an existing contextual panel is open;

an execute key for executing an application on said electronic device when a user selects said execute key;

a panel key for displaying a panel comprising additional information associated with an application executable on said electronic device, wherein upon selecting said panel key and a status indicates no option panel is open, displaying on said electronic device an option panel contextually related to an application represented by an indicator, wherein said option panel comprises one or more additional indicators with respect to available options of said application;

upon selecting a panel key and said status indicates an open option panel, closing said open option panel;

upon selecting a navigation key and said status indicates an existing option panel is open, closing existing option panel, and displaying on said electronic device another option panel contextually related to another one of an application executable on said electronic device, wherein said another option panel comprises one or more additional indicators with respect to available options of said another one of applications; and upon selecting an execute key and regardless of status of said option panel, executing on said electronic device an application indicated in a highlighted state.

11. The electronic device in accordance with claim 10 wherein said indicator is a graphical icon.

12. The electronic device in accordance with claim 10 wherein said panel is a contextual tab.

13. The electronic device in accordance with claim 10, wherein said indicators are non-highlighted when a clear key on said computing device is activated.

14. The electronic device in accordance with claim 10, wherein said application is a telephone application.

15. The electronic device in accordance with claim 10, wherein said application is a music application.

16. The electronic device in accordance with claim 10, wherein said highlighted indicator is an enlarged icon.

17. The electronic device in accordance with claim 10, wherein said highlighted indicator is a reverse video icon.

18. The electronic device in accordance with claim 12, wherein said contextual tab is scrollable.

19. The electronic device in accordance with claim 12, wherein said contextual tab is highlighted upon activation by said user.

* * * * *